US008489476B1

(12) United States Patent
Lester et al.

(10) Patent No.: US 8,489,476 B1
(45) Date of Patent: Jul. 16, 2013

(54) DATA MANAGER FOR SUSPICIOUS ACTIVITY MONITOR

(75) Inventors: Michael Wayne Lester, San Antonio, TX (US); Stephen E. Lozier, Universal City, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 607 days.

(21) Appl. No.: 12/191,234

(22) Filed: Aug. 13, 2008

Related U.S. Application Data

(60) Provisional application No. 61/077,065, filed on Jun. 30, 2008.

(51) Int. Cl.
*G06Q 40/00* (2012.01)

(52) U.S. Cl.
USPC .......................................................... 705/35

(58) Field of Classification Search
USPC .......................................................... 705/35
See application file for complete search history.

(56) References Cited

U.S. PATENT DOCUMENTS

| | | | |
|---|---|---|---|
| 6,035,279 A | 3/2000 | Montangero et al. | |
| 6,128,602 A | 10/2000 | Northington et al. | |
| 6,366,967 B1 | 4/2002 | Wagner | |
| 2003/0197782 A1 | 10/2003 | Ashe et al. | |
| 2003/0220878 A1 | 11/2003 | Degen et al. | |
| 2007/0276928 A1 | 11/2007 | Rhoads et al. | |
| 2008/0021801 A1* | 1/2008 | Song et al. ...................... | 705/35 |
| 2008/0040275 A1* | 2/2008 | Paulsen et al. .................. | 705/44 |
| 2008/0120688 A1 | 5/2008 | Qui et al. | |
| 2008/0301175 A1* | 12/2008 | Applebaum et al. .......... | 707/102 |

OTHER PUBLICATIONS iPrevent White Paper. "Enterprise-Wide Fraud/Abnormal Behavior Detection and Predictive Risk Management Solution." Brighterion Inc, [retrieved from the Internet on Oct. 16, 2008 using <URL: http://www.brighterion.com/WhitePaper_brighterion.pdf>].
HSBC. "Combating financial crime." HSBC.com, Inc, [retrieved from the Internet on Oct. 16, 2008 using <URL: http://www.hsbc.com/1/2/sustainability/our-sustainable-approach-to-banking/combating-financial-crime>].
NetEconomy. "NetEconomy Announces Landmark Solution to Fight Financial Crime." Business Wire, published Nov. 10, 2004, [retrieved from the Internet on Oct. 16, 2008 using <URL: http://findarticles.com/p/articles/mi_m0EIN/is_2004_Nov_11/ai_n6346132/print?tag=artBody;col1>].
iPrevent,"Real-Time Fraud Prevention and Identity Theft Protection," Brighton Inc., May 31, 2008, p. 12.
U.S. Appl. No. 12/191,238, filed Aug. 13, 2008, entitled "Data Manager for Suspicious Activity Monitor" by Michael W. Lester.
U.S. Appl. No. 12/191,239, filed Aug. 13, 2008, entitled "Data Manager for Suspicious Activity Monitor" by Michael W. Lester.

* cited by examiner

*Primary Examiner* — Daniel Felten
*Assistant Examiner* — Clifford Madamba
(74) *Attorney, Agent, or Firm* — Brooks, Cameron & Huebsch, PLLC

(57) ABSTRACT

Systems and methods are disclosed for managing transaction data from a plurality of financial services for a suspicious activity monitor (SAM). In one implementation, transaction data from each financial service is conformed to a standard format for publication. The publication may occur either substantially in real time as each transaction is conducted, at predefined intervals, or in periodic batches. A SAM data manager may then retrieve and process the transaction messages, including filtering non-required transactions, removing levels of hierarchy from the data, arranging the data in a predefined document structure, adding tags that may be required by the SAM tool, and creating SAM messages. The SAM data manager may thereafter forward the SAM messages to the SAM tool for analysis. In some embodiments, the SAM data manager may also send any updates of member and account data contained in the transaction messages to a central repository for such data.

21 Claims, 18 Drawing Sheets

| Source System | Data Type | Transport | Approach |
|---|---|---|---|
| Checking/Savings | Financial Transactions & Account Changes | PUB/SUB | 30 Minute "Micro-Batch" Published through Broker. |
| Checking/Savings | Financial Transactions & Account Changes Originated in Batch | PUB/SUB | End of Day Batch Published through Broker. Contains Transactions that would not show up in Log File. |
| Checking/Savings | Account Master Reconciliation | File Batch | Weekly Account Master refresh (Accts, Balances, end of day Status/Baseline). Ingest via ETL. |
| Mutual Funds | Financial Transactions & Account Changes | PUB/SUB | 15 Minute "Micro-Batch" Published through Broker. |
| Mutual Funds | Account Master Reconciliation | File Batch | Weekly Account Master refresh; Batch. Ingest via ETL. |
| Electronic Payments | Rejects | PUB/SUB | Daily Extract Published through Broker. |
| FTW | Financial Transactions & Account Changes | PUB/SUB | Real-Time Published through Broker. Contains changes to External Accounts and Financial Transactions. |
| Brokerage (Customer Access) | Financial Transactions & Account Changes | PUB/SUB | Real-Time Publish to Broker of Executed Transactions. |
| Brokerage (Customer Access) | Account Master Reconciliation | File Batch | Weekly Account Master refresh; Batch. |
| Customer Data: EIA | Customer | File Batch | Daily Incremental refresh from EIA. |

FIG. 4

| Detection | Pre-work | Investigation | Reports |
|---|---|---|---|

1002, 1004, 1006, 1008

Case #: 10896  ~1010

User ID: Analyst A  ~1012

Discovery Date:
SAR Submission Deadline:  ~1014

Suspicious Amount: $5,148.32

Transaction 1: $1,548.510

Transaction 2: $2,653.12

. . .

Transaction x: $2,653.12

Add Transaction  ~1016

☐ Pre-work Referral  ~1018

|  1002 | 1004 | 1006 | 1008 |
|---|---|---|---|
| Detection | Pre-work | Investigation | Reports |

Case #: 10896 — 1010

User ID: Pre-work Investigator A — 1012

Discovery Date: 12/1/20008
SAR Submission Deadline: 12/31/2008 — 1014

Suspicious Amount: $5,148.32

Transaction 1: $1,548.510

Transaction 2: $2,653.12

. . .

Transaction x: $2,653.12

(Add Transaction) — 1016

☒ Information Item 1    ☒ Assignment
☒ Information Item 2    ☐ Return to Detection
☒ Information Item 3
☒ Information Item 4 — 1020

| 1002 | 1004 | 1006 | 1008 |
|---|---|---|---|
| Detection | Pre-work | Investigation | Reports |

Case #: 10896 — 1010

User ID: Investigator A — 1012

Discovery Date: 12/1/2008
SAR Submission Deadline: 12/30/2008 — 1014

Suspicious Amount: $5,148.32

Transaction 1: $1,548.510

Transaction 2: $2,653.12

. . .

Transaction x: $2,653.12

(Add Transaction) — 1016

Action 1: 12/1/2008     ☒ Review
Action 2: _____        12/1/2008
. . .                    ☐ Approval
SAR Filed: _____       _____  — 1022

☐ Cancel SAR

| Investigator A | | | |
|---|---|---|---|
| CASE # | SAR DEADLINE | STATUS | |
| 1234 | 7/4/2008 | Closed | |
| 5678 | 10/31/2008 | Awaiting Approval | |
| 9012 | 11/27/2008 | In Progress | |
| 3456 | 12/25/2008 | In Progress | |

|  | | 1200 | |
|---|---|---|---|
| Supervisor X | | | |
| CASE # | PRE-WORK | ASSIGNED | STATUS |
| 2345 | Complete | Investigator A ▼ | Closed |
| 67812 | Complete | Investigator B ▼ | Awaiting Approval |
| 0123 | Complete | Investigator C ▼ | In Progress |
| 4567 | Incomplete | Unassigned ▼ | N/A |

FIG. 12A

|  | | | 1202 |
|---|---|---|---|
| Supervisor Y | | | |
| INVESTIGATOR | CASES (Total = 22) | COMPLETED | COMPLIANCE |
| Investigator A | 5 | 1 | 80% |
| Investigator B | 7 | 5 | 100% |
| Investigator C | 4 | 2 | 50% |
| Investigator D | 6 | 3 | 50% |

FIG. 12B

DATA MANAGER FOR SUSPICIOUS ACTIVITY MONITOR

CROSS-REFERENCE TO RELATED APPLICATIONS

This application claims the benefit of priority to, and hereby incorporates by reference in its entirety, U.S. Provisional Application No. 61/077,065, entitled, "Messaging for Suspicious Activity Report," filed Jun. 30, 2008. This application is also related in subject matter to, and incorporates herein by reference in its entirety, each of the following: U.S. patent application entitled "Data Manager for Suspicious Activity Monitor,", filed on the same date as this application, and U.S. patent application entitled "Data Manager for Suspicious Activity Monitor,", also filed on the same date as this application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to tools for monitoring suspicious activity in financial and related transactions and, more specifically, to systems and methods for providing transaction data from multiple different financial services to such suspicious activity monitoring tools.

BACKGROUND

Financial services companies, such as banks, credit card companies, investment companies, and the like, handle numerous types of financial transactions as well as non-monetary or administrative transactions on a daily basis. Examples of financial transactions may include deposits, withdrawals, debit card payments, credit card payments, funds transfers, bill payments and the like. Examples of non-monetary transactions may include opening of new accounts, account closures, address changes, user ID and/or password changes, account type changes, and the like. These various transactions make it possible and convenient for consumers and businesses alike to buy and sell goods and services and to generally carry out commercial as well as non-commercial activities.

Most transactions are legitimate events that are carried out for genuine business or personal reasons. However, a small (but growing) number of transactions are conducted with the intent to launder money, commit theft, perpetrate fraud, and other financial crimes. In a typical fraudulent transaction, an unknown party opens a new bank account and makes several small, but legitimate deposits, all of which clear the bank in due course. Shortly thereafter, however, the party makes a much larger, but fraudulent deposit into the account, and begins almost immediately to withdraw all or a portion of the deposited amount. The unwary bank, not suspecting that a fraudulent transaction is in progress, allows the party to withdraw the funds before the deposit has cleared. Several days later when the bank realizes that a fraud has been perpetrated (i.e., because the deposited funds have not cleared), the perpetrator and withdrawn funds are nowhere to be found.

Several tools are commercially available to help detect and prevent the above and other types of fraudulent activities. These tools are generally referred to as suspicious activity monitors (SAM) and are designed to detect transactions that may be indicative of a financial crime. Basically, these SAM tools take in data concerning a transaction and compare the data to a set of rules or scenarios that are defined based on experience with previous fraudulent activities. The rules and scenarios may include, for example, deposits over a certain amount (e.g., $100,000) into a personal account, remotely accessing an account from locations known for fraudulent activities (e.g., Eastern Europe, Asia), and the like. If the transaction violates one of the rules or fits one of the scenarios, then the SAM tool issues an alert notifying the financial services company that a fraudulent activity may be taking place.

Existing SAM tools, however, lack the ability to handle disparate types of transaction data from multiple different financial services. A single integrated financial services company may provide, for example, banking services, credit card services, investment services, and the like. Each financial service may constitute a separate business unit within the integrated financial services company may have one or more lines of business. Thus, each of the financial services may produce transaction data in its own format, timing, and/or channel that may be different from the other financial services.

Accordingly, what is needed is a way to be able to standardize or otherwise convert to a common format the transaction data generated by the different financial services, and to be able to present this standardized transaction data to the SAM tool over a common channel substantially in real time.

SUMMARY

The disclosed embodiments provide systems and methods for managing financial transaction data from a plurality of financial services for a SAM tool. In one implementation, transaction data from each financial service is conformed to a standard format for publication. The publication may occur either substantially in real time as each transaction is conducted, at predefined intervals, or in periodic batches. A SAM data manager may then retrieve and process the transaction messages, including filtering non-required transactions, removing levels of hierarchy from the data, arranging the data in a predefined document structure, adding tags that may be required by the SAM tool, and creating SAM messages. The SAM data manager may thereafter forward the SAM messages to the SAM tool for analysis. In some embodiments, the SAM data manager may also send any updates of member and account data contained in the transaction messages to a central repository for such data.

BRIEF DESCRIPTION OF THE DRAWINGS

The foregoing and other advantages of the invention will become apparent from the following detailed description and upon reference to the drawings, wherein:

FIG. 4 is a summary of the publishers and interfaces of the messaging infrastructure according to the disclosed embodiments;

FIGS. 10A-10D illustrate an exemplary case management tool provided by a suspicious activity report workflow application according to the disclosed embodiments;

FIG. 11 illustrates an exemplary investigator report generated by a suspicious activity report workflow application according to the disclosed embodiments;

FIGS. 12A-12B illustrate exemplary supervisory reports generated by a suspicious activity report workflow application according to the disclosed embodiments.

DETAILED DESCRIPTION

Figure 1:
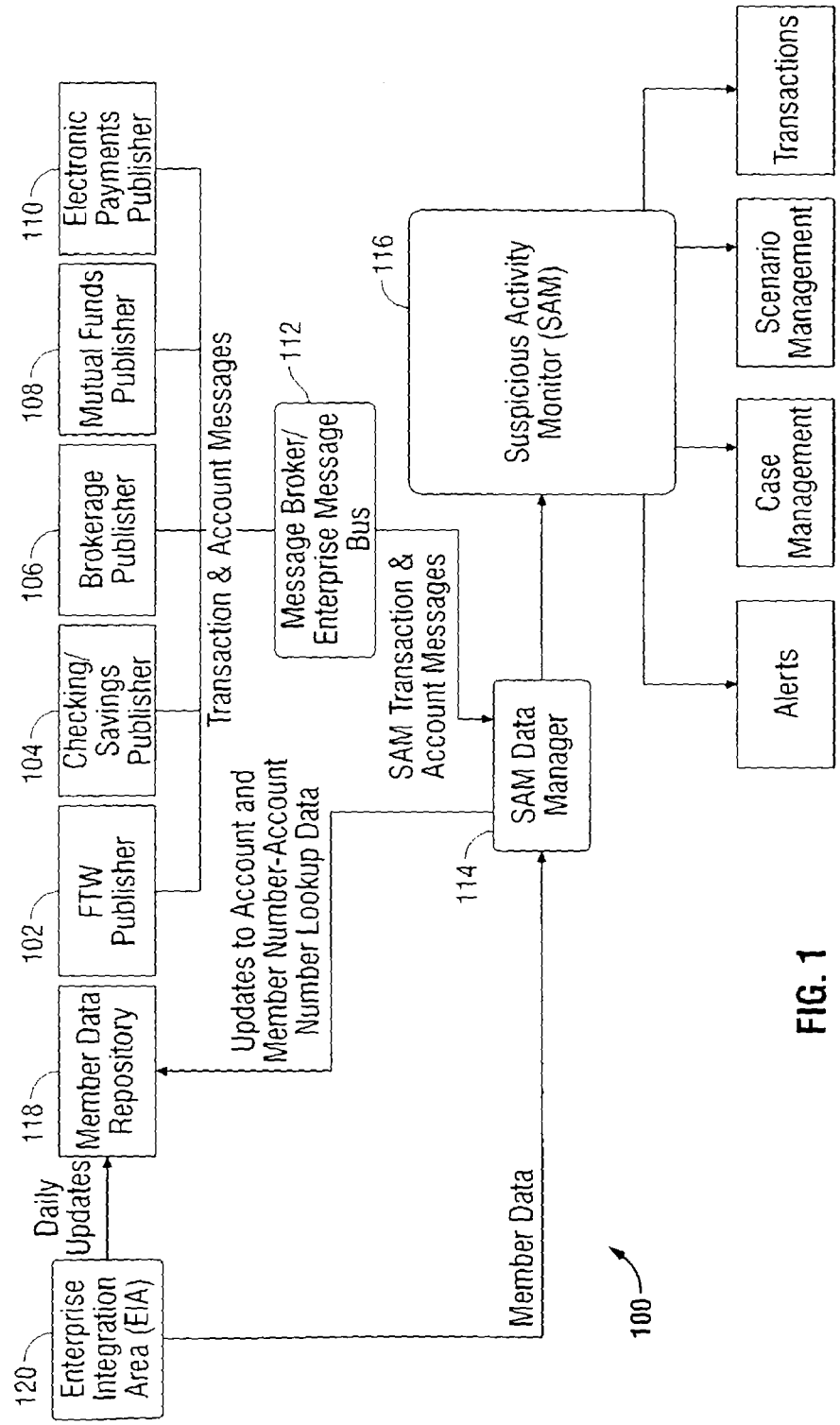
FIG. 1 illustrates an exemplary messaging infrastructure for providing transaction data to a SAM tool according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In other implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Turning now to the disclosed embodiments, a messaging infrastructure may be provided for forwarding or otherwise routing transaction data generated by an integrated financial services company to a SAM tool. The SAM tool may then monitor the data to detect suspicious activity substantially in real time and alert the financial services company as appropriate. The term "substantially in real time" means either immediately or within a predefined amount of time (e.g., 15 minutes, 30 minutes, 45 minutes, one hour, etc.) of the transaction, depending on when the SAM tool receives the transaction data. SAM tools that may be used with the messaging infrastructure of the disclosed embodiments may include, for example, those available from Norkom Technologies, STB Systems, Acuity, and the like. Note that while the types of transactions that are of interest herein relate to fraud, money laundering, and the like, the messaging infrastructure of the disclosed embodiments is also fully applicable to other types of monitoring and detection. For example, the messaging infrastructure of the disclosed embodiments may be used by an information technology (IT) team to monitor and detect each time customers log on to a financial institution's Web site, call a customer service representative, and the like.

In one implementation, the messaging infrastructure may use an asynchronous messaging system. One such system is a so-called "publish-subscribe" system where, instead of senders (or publishers) sending (or publishing) messages to specific receivers (or subscribers), the publishers publish messages without knowledge of the specific subscribers (if any). The subscribers then sign up (or subscribe) to receive one or more categories of messages without knowledge of the specific publishers (if any). A message broker filters the messages and delivers them to the subscribers based on the message topic, content, or a combination of both. An advantage of the publish-subscribe system is that the published messages are available to all subscribers, thus allowing a subscriber to receive messages from multiple publishers. Commercial publish-subscribe messaging systems that may be used with the messaging infrastructure include Message Broker from International Business Machine (IBM) Corp., MSMQ from Microsoft Corp., SonicMQ from Progress Software Corp., and the like.

An exemplary messaging infrastructure 100 that uses a publish-subscribe system according to the disclosed embodiments is shown in FIG. 1. As can be seen, each one of several financial services of an integrated financial services company is provided with its own publisher. The particular financial services shown here include electronic funds or wire transfer services (called a financial transaction warehouse herein), checking and savings account services, brokerage services, mutual fund services, and electronic payment or ACH (Automated Clearing House) return services. Thus, there is a financial transaction warehouse (FTW) publisher 102, a checking and savings account publisher 104, a brokerage publisher 106, a mutual funds publisher 108, and a electronic payments publisher 110. Of course, other financial services besides the ones listed here may use the principles and teachings of the disclosed embodiments. An advantage of the above arrangement is that no modification need be made to existing systems and/or back-ends of the financial services (i.e., these components may continue to operate as they are).

Upon receipt of transaction data generated by their respective financial services, the publishers 102-110 are designed to publish, substantially in real time, financial transaction messages and account maintenance messages to a message broker 112 via an enterprise message bus. The message broker 112 then filters the financial transaction and account maintenance messages and delivers them to a SAM data manager 114. The SAM data manager 114 processes these messages and sends them to a SAM tool 116 for monitoring and detection of suspicious activity. In some embodiments, the SAM data manager 114 may also forward any account and member data, or updates thereto that were detected in the messages, to a member data repository 118, which may contain a centralized source of account, member number, and account number data that may then be used by the SAM data manager 114 to look up member and account data as needed. An enterprise integration area (EIA) 120 stores enterprise-wide member data for the integrated financial services company and may provide this data to the member data repository 118 as well as to the SAM data manager 114 as needed.

Preferably, transactions are published regardless of where and how they are conducted. For example, the transactions may be conducted via a Web site, interactive voice response (IVR) system, company portal, customer service representative, recurring transactions, and the like. In some embodiments, each transaction is published as its own message, while in other embodiments, several related transactions may be published in the same message. Similarly, the messages may be published with only certain types of transaction data as specified by the SAM tool 116, or they may be published with as much transaction data as available, thereby allowing the SAM tool 116 to decide which data to use.

In accordance with the disclosed embodiments, a messaging framework may be provided for the publish-subscribe system of the messaging infrastructure to allow the transaction and account messages from the various financial services to be standardized. The messages standardized in this way may be text files, XML files, binary files, and the like, and may have a common messaging format with a standardized set of fields that are usable by the SAM tool 116. The standardized messages may then be forwarded to the SAM tool 116 to monitor and detect suspicious activity substantially in real time for some or all of the financial services of the integrated financial services company.

In some embodiments, conversion of transaction and account messages to a standardized messaging format may involve defining the transaction in terms of an "event" in accordance with the publish-subscribe model, where fields are used to indicate actions and so forth. For example, "events" in the Message Broker publish-subscribe system from IBM have the following message sections: Topic, Attribute 1, Attribute 2 . . . Attribute N, and Payload Data. The Topic section contains the event name (e.g., Monetary Transaction, Account Maintenance, etc.), while the Attribute section contains information about the event that can be used for filtering and routing the messages to subscribers (e.g., the data manager 114, the SAM tool 116, etc.). The attributes may be set at design time, for example by determining which elements the subscribers may wish to use to filter the data within a given topic, or they may be set at some other time. Subscribers may specify subscriptions through SQL-like selection criteria based on these attributes. For example, having "Transaction Amount" as an attribute in the message envelope for a Monetary Transaction topic allows subscribers to filter for certain amounts (e.g., greater than $9,999). The Payload section is typically text that conveys transaction details and may therefore occasionally include data that is duplicative of data found in the Attribute section.

To facilitate standardization of the various transaction and account messages, the fields in the various sections of the messages published in the messaging infrastructure of the disclosed embodiments should adhere to a common format. For example, date and time fields should have a common format, address fields should have a common format, phone number fields should have a common format, Boolean fields should have a common format, and so forth. In addition, different financial services sometimes use different domain values or codes to convey the same thing. Accordingly, for consistency, a common set of domain values for the various fields may also be provided for the messages published in the messaging infrastructure 100 of the disclosed embodiments. As an example, the domain values that may be used with an Account Status field may be limited to the following: open, close, dormant, suspended. Examples of a common format and common domain values that may be used with the messaging infrastructure 100 of the disclosed embodiments are provided in Table 1 (which presents general formatting guidelines that may be applicable to all messages) and Table 2 (which presents exemplary common domain values that may be used by the various publishers). Note in Tables 1 and 2 that, although the entries are self-explanatory, comments have been added to certain entries to further assist understanding and not as limitations on the disclosed embodiments.

TABLE 1

EXEMPLARY DATA FORMATS

| FIELD TYPE | FORMAT | COMMENT |
| --- | --- | --- |
| Date | yyyymmdd | yyyy = year, mm = month, dd = day |
| Date/Time | yyyymmdd hh:mi:ss | Use 24 hour clock |
| Money | FLOAT | |
| Variable Text | Vartext(128) | Limit the width of variable text fields to 128 bytes when possible |
| Boolean | Char(1) | 'T' for True, 'F' for False |
| Phone Numbers | (999) 799-9999 +99-(9)9999-9999-9999 | Include parentheses and dashes in phone number. |

TABLE 2

EXEMPLARY DOMAIN VALUES

| FIELD <XML TAG> | DOMAIN VALUES | COMMENT |
|---|---|---|
| Account Status <Account Status> | | Indicates whether or not an account is in a state to accept transactions. |
| | Open | Account is active and ready to accept business. |
| | Closed | Account is inactive. |
| | Dormant | Account has not been used for a long time. |
| | Suspended | Account has been inactivated to prevent monetary transactions from occurring. |
| Account Type <AccountType> | | |
| | Checking | |
| | Savings | |
| | Brokerage | |
| | Mutual Fund | |
| | Credit Card | |
| | Consumer Loan | |
| | Home Equity Loan | |
| | Mortgage | |
| | Auto Loan | |
| | Property Insurance | |
| | Merchandise | |
| | Annuity | |
| System Name <System Name> | | Name of source system from which a publish message was originated. |
| | Checking/Savings Accounts | |
| | Electronic Payments | |
| | FTW | |
| | Brokerage | |
| | Mutual Funds | |
| Action <action> | | Specific action taken on account. |
| | Add | |
| | Change | |
| | Delete | |
| Channel <channel> | | Channel from which a publish message was originated. |
| | Other | |
| | CSR | Customer service representatives |
| Device ID <devID> | Internet | Company Web site |
| | Voice | Interactive voice response system Address from which a transaction was conducted. |
| | IP address | |
| Event State <eventState> | | Some published messages are sent from a Web application or a front-end system such as a bank service center. These messages may not have been executed/fulfilled by the back-end system and thus may not include all necessary details. Other published messages are sent by the back-end upon fulfilment and may be in response to a request. To avoid ingesting duplicate messages (both request and fulfilment), messages should have an Event State tag containing the indicated values. |
| | Requested | Request from a front-end system for services. |
| | Executed | Request has been fulfilled, booked, and/or executed. |
| Member Number <MbrNum> | | Nine-digit member number, padded with zeroes as needed. |

The types of messages contemplated for the messaging infrastructure 100 of the disclosed embodiments may include, for example, product origination (ProdOrigination); product party change (ChgPartyProdRel); account list change (AcctListChanged); account/product status change (ProdStatusChg); address change (AddressChange); and financial transaction (MonetaryTransaction). Specific examples of the specifications for these messages are provided in Tables 3.1, 3.2, 3.3., 3.4., 3.5, and 3.6, below. As was the case for Tables 1 and 2, note that although the entries in Tables 3.1 through 3.6 are self-explanatory, comments have been added to certain entries to further assist understanding and not as limitations on the disclosed embodiments.

TABLE 3.1

EXAMPLE OF MESSAGE SPECIFICATIONS FOR PRODUCT ORIGINATIONS

| MESSAGE NAME | TOPIC NAME |
|---|---|
| ProdOrigination | Customer/Product/Origination/v1.0/xml |

Description: Member purchased a product.

| ENVELOPE ATTRIBUTE | DESCRIPTION | DOMAIN VALUES |
|---|---|---|
| correlationId | Key used to correlate multiple events | |
| mbrNum | 9 digits, lead padded with zeroes | |
| businessUnit | | Bank, Life Insurance, Investment Management, etc. |
| lineofBusiness | | Deposits, Credit Card, Brokerage, etc. |
| productCategory | | |
| productType | Translated product code | |
| productLocation | State of coverage, State of mortgage, etc. | |
| accountNum | | |
| applicationDate | If applicable/known | |
| openedDate | If applicable/known | |
| expirationDate | If applicable/known | |

TABLE 3.1-continued

EXAMPLE OF MESSAGE SPECIFICATIONS FOR PRODUCT ORIGINATIONS

| | |
|---|---|
| statusDate | If applicable/known |
| solicitID | Campaign ID, Preapproval code |
| newOriginationStatus | Applied, Approved, Denied, Withdrawn, Booked |
| previousOriginationStatus | Null, Approved, Denied, Withdrawn |
| descriptionText | |

PAYLOAD DESCRIPTION

| XML Tag Name | Request? | Purpose | Domain Values |
|---|---|---|---|
| <system Name/> | Y | System Name of publisher | See System Name (Table 2) |
| <correlationId> | N | Key to correlate multiple events, if applicable. | |
| <mbrNum> | Y | Member number of primary account holder. | |
| <decisionTiming> | N | Required only for credit card account request. | delayedDecision |
| <account> | | | |
| <descriptionText/> | Y | Textual description of account, possibly including the owner. Example: John Smith | |
| <accountNum/> | Y | Account Number from source system. | |
| <bankId/> | Y | Bank Id, Transit Routing Number, or an ID differentiating this account from others. | |
| <priActHolder> | Y | Primary account holder open tag. | |
| <mbrNum/> | Y | Member number | |
| <lastName/> | Y | Primary member last name | |
| <firstName/> | Y | Primary member first name | |
| <mi/> | N | Primary member middle initial | |
| <signAuthIND/> | Y | Signature authority indicator - T/F flag indicates if the holder is authorized to debit this account or conduct trading. | T\|F |
| </priActHolder > | Y | Close tag for member info | |
| <jointHolder> | N | Open tag for joint holders. Repeating section to indicate multiple joint holders. | |
| <Num > | N | Member number of Joint Holder | |
| <lastName> | N | | |
| <firstName> | N | | |
| <mi/> | N | | |
| <signAuthorityIND/> | N | Signature authority indicator Required if joint holder tag provided | T\|F |
| <mailingAddress> | | Joint holder mailing address | |
| <addr1/> | Y | Postal address | |
| <addr2/> | N | | |
| <addr3/> | N | | |
| <city/> | Y | | |
| <state/> | Y | | |
| <zip/> | Y | | |
| <zip+4/> | N | | |
| <phone/> | N | Phone number formatted as (999)999-9999 | |
| </mailingAddress> | | | |
| </jointHolder> | N | Close tag | |

TABLE 3.1-continued

EXAMPLE OF MESSAGE SPECIFICATIONS FOR PRODUCT ORIGINATIONS

| | | | |
|---|---|---|---|
| <entity> | N | Open tag for entities (businesses, trusts, etc.) associated with the account. | |
| <entityType> | N | | Business, Trust, etc. |
| <entityName/> | N | If an account holder is an entity | |
| <signAuthIND/> | N | Signature authority indicator, required if joint holder tag provided | T\|F |
| </Entity> | N | Close tag | |
| <accountType> | Y | Account | See Account Types (Table 2). |
| <openedDate/> | Y | Date the account opened | |
| <accountStatus/> | Y | Account Status - for AddNewAccount, should always be Open. | See Account Status (Table 2). |
| <statusDate/> | Y | Date/Time of maintenance to an account (e.g., statement address change, status change from "Open" to "Close"). | Date\|Time |
| <applicationDate/> | N | Date account applied for | |
| <expirationDate/> | N | Date account expired or will expire | |
| <acctBalance/> | N | Available balance. | |
| <acctValue/> | N | Market value where applicable | |
| <stmtAddress> | Y | Address used to have account statements sent. | |
| <addr1/> | Y | Postal address | |
| <addr2/> | N | | |
| <addr3/> | N | | |
| <city/> | Y | | |
| <state/> | Y | | |
| <zip/> | Y | | |
| <zip+4/> | N | | |
| <phone/> | N | Phone number formatted as (999)999-9999 | |
| <stmtAddress > | | | |
| <jointOwnership/> | N | | Joint\|Individual |
| <overdraftProteetion> | N | T\|F flag to indicate if account has overdraft protection setup. | T\|F |
| <trustAccountIND> | N | T\|F flag to indicate that this is a trust account | T\|F |
| <powerofAttorney-ExistsIND> | N | T\|F flag to indicate whether a power of attorney exists | T\|F |
| </Account> | | Close account tag | |
| <devId/> | N | Device ID | See Device ID (Table 2). |
| <channel/> | N | Channel | See Channels (Table 2). |
| <userId/> | N | User ID initiating transaction | Employee ID or member number |

TABLE 3.2

EXAMPLE OF MESSAGE SPECIFICATIONS FOR CHANGES TO PARTY PRODUCT RELATIONSHIPS

| MESSAGE NAME | TOPIC NAME | |
|---|---|---|
| ChgPartyProdRel | Customer/ChangePartyProductRelationship/v1.0/xml | |

Description: A beneficiary or secondary party to the product/account was added, deleted, or changed.

| ENVELOPE ATTRIBUTE | DESCRIPTION | DOMAIN VALUES |
|---|---|---|
| correlationId | Key used to correlate multiple events | |

TABLE 3.2-continued

EXAMPLE OF MESSAGE SPECIFICATIONS FOR CHANGES TO PARTY PRODUCT RELATIONSHIPS

| | | |
|---|---|---|
| mbrNum | 9 digits, lead padded with zeroes | |
| businessUnit | | Bank, Life Insurance, Investment Management, etc. |
| lineofBusiness | | Deposits, Credit Card, Brokerage, etc. |
| eventType | | |
| productCategory | | |
| productType | Translated product code | |
| accountNum | | |
| productRelationship | Primary, secondary, beneficiary | |
| effectiveDate | If applicable/known | |
| descriptionText | | |

PAYLOAD DESCRIPTION

| XML Tag Name | Request? | Purpose | Domain Values |
|---|---|---|---|
| <eventState/> | | | See Event State (Table 2). |
| <system Name/> | Y | System or application name | See System Name (Table 2). |
| <eventType/> | Y | | Add, Change, Delete |
| <acctNum/> | Y | Account number from source system | |
| <mbrNum> | Y | Member number of joint holder being added, changed or deleted | Date|Time |
| <statusDate/> | Y | Date/Time of addition | See Device ID (Table 2). |
| <devId> | N | Device ID | See Channels (Table 2). |
| <channel/> | N | Channel | |
| <userId/> | N | User ID of person initiating transaction | Employee ID or member number |

TABLE 3.3

EXAMPLE OF MESSAGE SPECIFICATIONS FOR ACCOUNT LIST CHANGES

| MESSAGE NAME | TOPIC NAME | |
|---|---|---|
| AcctListChanged | Customer/AccountListChanged/v1.0/xml | |

Description: An external account was added, changed, or deleted to the list of accounts associated with a product.

| ENVELOPE ATTRIBUTE | DESCRIPTION | DOMAIN VALUES |
|---|---|---|
| correlationId | Key used to correlate multiple events | |
| mbrNum | Nine digits, lead padded with zeroes | |
| eventType | | |
| listType | FTW, Deposits, etc. | |
| systemName | | |
| businessUnit | | Bank, Life Insurance, Investment Management, etc. |
| lineofBusiness | | Deposits, Credit Card, Brokerage, etc. |
| productCategory | | |
| productType | | |
| targetAccountNumber | | |
| targetTRN | | |

TABLE 3.3-continued

EXAMPLE OF MESSAGE SPECIFICATIONS FOR ACCOUNT LIST CHANGES targetProductCategory
targetProductType
descriptionText

PAYLOAD DESCRIPTION

| XML Tag Name | Request? | Purpose | Domain Values |
|---|---|---|---|
| <eventState/> | Y | Lifecycle state of this message | See Event State (Table 2). |
| <system Name/> | Y | System Name | See System Name (Table 2). |
| <eventType/> | Y | | Add, Change, Delete |
| <Account> | | Note: Use Account definition in ProdOrigination message above | Note: If action is Delete, only account tags are required: <acctNum/> (See Table 3.1) |
| ... | | | |
| </Account> | | Close account tag | |
| </Reason> | | Reason code | |
| <devId/> | N | Device ID | See Device ID (Table 2). |
| <channel/> | N | Channel | See Channels (Table 2). |
| <userId/> | N | | Employee ID or member number |

TABLE 3.4

EXAMPLE OF MESSAGE SPECIFICATIONS FOR PRODUCT STATUS CHANGES

| MESSAGE NAME | TOPIC NAME |
|---|---|
| ProdStatusChg | Customer/ProductStatusChanged/v1.0/xml |

Description: Product or account status was changed.

| ENVELOPE ATTRIBUTE | DESCRIPTION | DOMAIN VALUES |
|---|---|---|
| correlationId | Key used to correlate multiple events | |
| mbrNum | 9 digits, lead padded with zeroes | |
| businessUnit | | Bank, Life Insurance, Investment Management, etc. |
| lineofBusiness | | Deposits, Credit Card, Brokerage, etc. |
| productCategory | | |
| productType | | |
| prevProductStatus | | |
| newProductStatus | | |
| accountNum | | |
| descriptionText | | |
| reason | | |

PAYLOAD DESCRIPTION

| XML Tag Name | Request? | Purpose | Domain Values |
|---|---|---|---|
| <correlationId> | Y | | |
| <eventState/> | Y | Lifecycle state of this message | See Event State (Table 2). |
| <system Name/> | Y | System Name | See System Name (Table 2). |
| <mbrNum> | Y | Member number | |
| <acctNum/> | Y | Account number | |
| <statusDate/> | Y | Date when change of status occurred | Date|Time |
| <accountType/> | Y | | |
| <prevProductStatus/> | N | The current status (i.e., Open, Dormant, Suspended or Closed). | See Account Status (Table 2). |
| <newProductStatus/> | Y | The "to status" (i.e., Open, Dormant, Suspended or Closed). | See Account Status (Table 2). |

TABLE 3.4-continued

EXAMPLE OF MESSAGE SPECIFICATIONS FOR PRODUCT STATUS CHANGES

| | | | |
|---|---|---|---|
| <reason> | N | Reason code | |
| <devId> | N | Device ID | See Device ID (Table 2). |
| <channel/> | N | Channel | See Channels (Table 2). |
| <userId/> | N | | Employee ID or member number |

TABLE 3.5

EXAMPLE OF MESSAGE SPECIFICATIONS FOR ADDRESS CHANGES

| MESSAGE NAME | TOPIC NAME |
|---|---|
| AddressChange | Customer/AddressChange/v1.0/xml |

Description: An address change occurred for a product address, member address, etc.

| ENVELOPE ATTRIBUTE | DESCRIPTION | DOMAIN VALUES |
|---|---|---|
| correlationId | Key used to correlate multiple events | |
| mbrNum | Nine digits, lead padded with zeroes | |
| eventType | | |
| system Name | | |
| businessUnit | | Bank, Life Insurance, Investment Management, etc. |
| lineofBusiness | | Deposits, Credit Card, Brokerage, etc. |
| productCategory | | |
| productType | | |
| addressType | | |
| state | | |
| zip | | |

PAYLOAD DESCRIPTION

| XML Tag Name | Request? | Purpose | Domain Values |
|---|---|---|---|
| <eventState/> | Y | Lifecycle state of this message | See Event State (Table 2). |
| <system Name/> | Y | System Name | See System Name (Table 2). |
| <acctNum/> | | Account number | |
| <mbrNum> | | Member number | |
| <statusDate/> | | Date when change of status occurred | Date|Time |
| <AddressType> | Y | | Account - Statement Mailing Address; Physical - Residential address; no PO boxes; Mailing - mailing address; could include PO boxes |
| <ToAddress> | Y | | |
| <addr1> | N | | |
| <addr2/> | N | | |
| <addr3/> | Y | | |
| <city/> | Y | | |
| <state/> | Y | | |
| <zip/> | N | | |
| <zip+4/> | N | | |
| <phone/> | Y | | |
| </ToAddress> | Y | | |
| <devId> | N | Device ID | See Device ID (Table 2). |
| <channel/> | N | Channel | See Channels (Table 2). |
| <userId/> | N | | Employee ID or member number |

TABLE 3.6

EXAMPLE OF MESSAGE SPECIFICATIONS FOR MONETARY TRANSACTIONS

| MESSAGE NAME | TOPIC NAME |
|---|---|
| MonetaryTransaction | Customer/MonetaryTransaction/v1.0/xml |

Description: A financial transaction occurred.

| ENVELOPE ATTRIBUTE | DESCRIPTION | DOMAIN VALUES |
|---|---|---|
| correlationId | Key used to correlate multiple events | |
| mbrNum | 9 digits, lead padded with zeroes | |
| eventType | | |
| systemName | | |
| businessUnit | | Bank, Life Insurance, Investment Management, etc. |
| lineofBusiness | | Deposits, Credit Card, Brokerage, etc. |
| productCategory | | |
| productType | | |
| accountNum | | |
| amount | | |
| transactionDate | | |
| postDate | | |
| transactionID | | |
| transactionType | | |

PAYLOAD DESCRIPTION

| XML Tag Name | Request? | Purpose | Domain Values |
|---|---|---|---|
| <correlationID/> | | ID used to match related transactions | |
| <eventType/> | | | DEBIT\|CREDIT |
| <productCategory/> | | | |
| <eventState/> | Y | | See Event State (Table 2). |
| <systemName/> | Y | | See System Name (Table 2). |
| <mbrNum/> | Y | Member number | |
| <srcTrnRefId/> | Y | Unique transaction ID in source system that can inquire original transaction on source system | |
| <transactionType/> | Y | Transaction type | |
| <srcTrnCode/> | | Source transaction code - transaction code from publishing system | "By" (security purchase) "SL"(security sale) 303 (funds transfer) |
| <acctNumFrom/> | Y | Source account number | |
| <acctCompanyIdFrom/> | Y | Account company ID - transit routing number, or an ID to tell where this account belongs | |
| <acctTypeFrom/> | Y | Account type | See Account Types (Table 2). |
| <acctNumTo/> | N | Destination account number | |
| <description1/> | N | | |
| <description 2/> | N | | |
| <acctCompanyIdTo/> | N | Transit Routing Number, or an ID to tell where this account belongs | |
| <acctTypeTo/> | N | | |
| <amount/> | Y | Transaction Amount | |
| <trnDate/> | N | Transaction Requested or submitted date/time | Date\|Time |
| <finalDueDate/> | N | Adjusted processing date, Adjusted due to holidays | |
| <trnPostDate/> | N | Transaction posting date | |
| <trnStatus/> | Y | Transaction status | Request, Scheduled, Cancelled, Executed |
| <statusDate/> | Y | Transaction status date | |
| <srcTrnRefId2> | N | Reserved field, for future use | |

TABLE 3.6-continued

EXAMPLE OF MESSAGE SPECIFICATIONS FOR MONETARY TRANSACTIONS

| | | | |
|---|---|---|---|
| <recurringIND/> | Y | Indicates if this is spawned from a recurring model | T\|F |
| <trnAuthMethod/> | N | Authorization used for this transaction | Telephone, Web, In person |
| <trnSrvFee/> | N | Transaction service charge | Transaction Service Charge |
| <trnQuantity/> | N | Number of shares | |
| <unitPrice/> | N | Unit Price | Unit Price for shares or products |
| <symbol> | N | Ticker Symbol | Ticker symbol for equity trades |
| <devId/> | N | | See Device ID (Table 2). |
| <channel/> | N | | See Channels (Table 2). |
| <userId/> | N | | Employee ID or member number |

Specifications similar to those shown in Tables 3.1 through 3.6 may also be derived for batch updates by those of ordinary skill in the art without departing from the scope of the disclosed embodiments. Note that while the message specifications in Tables 3.1 through 3.6 refer to XML files, those having ordinary skill in the art will understand that other types of files may certainly be used without departing from the scope of the disclosed embodiments. In any event, adhering to these message specifications allows the various transaction and account messages to be standardized so that the messages appear substantially the same to the SAM tool 116 regardless of the particular financial services they came from. The standardized messages may then be forwarded to the SAM tool 116 for substantially real-time monitoring and detection of suspicious activity.

Figure 2A:
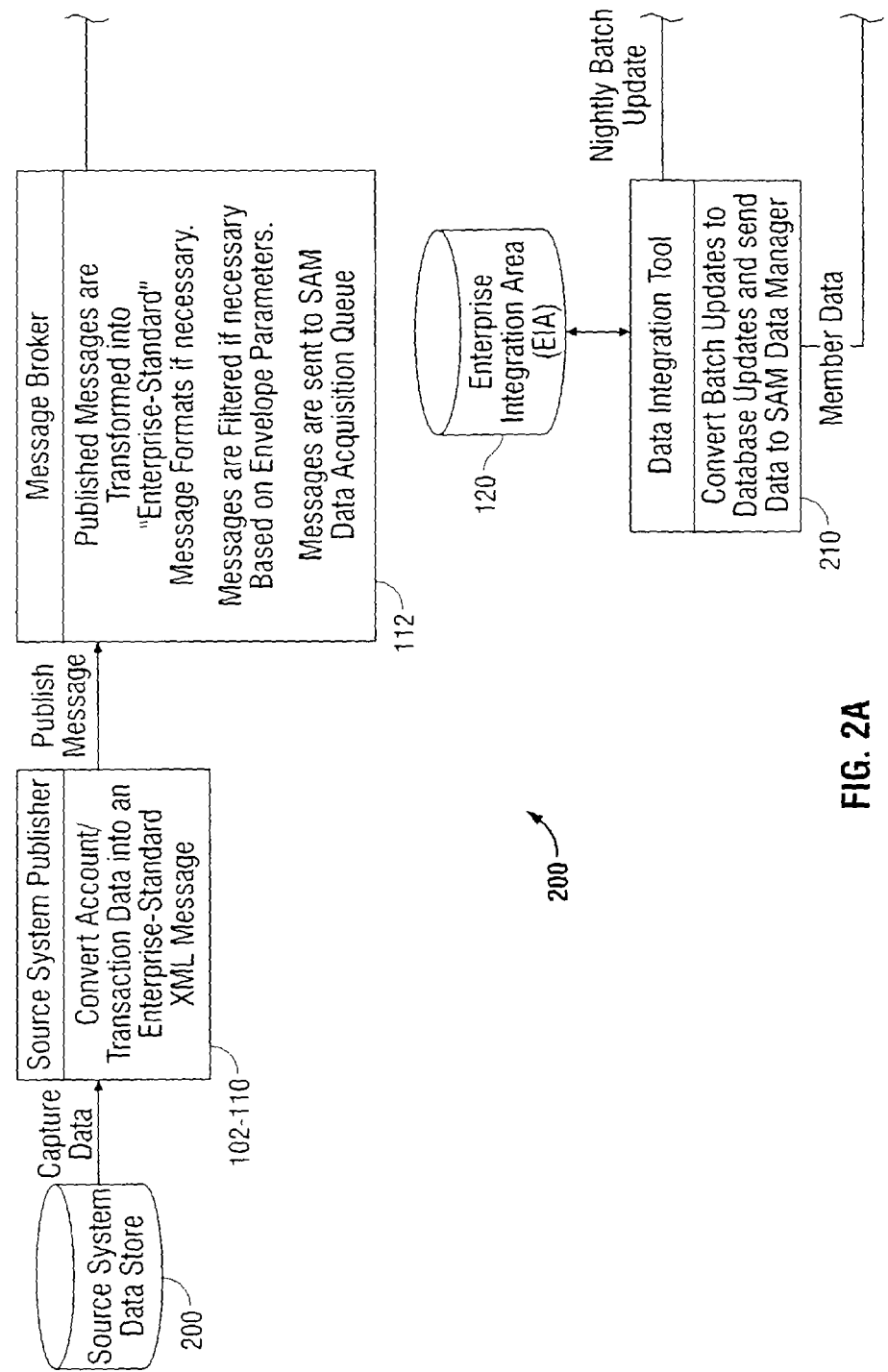
FIGS. 2A & 2B illustrate an exemplary message flow for the messaging infrastructure according to the disclosed embodiments.
Figure 2B:
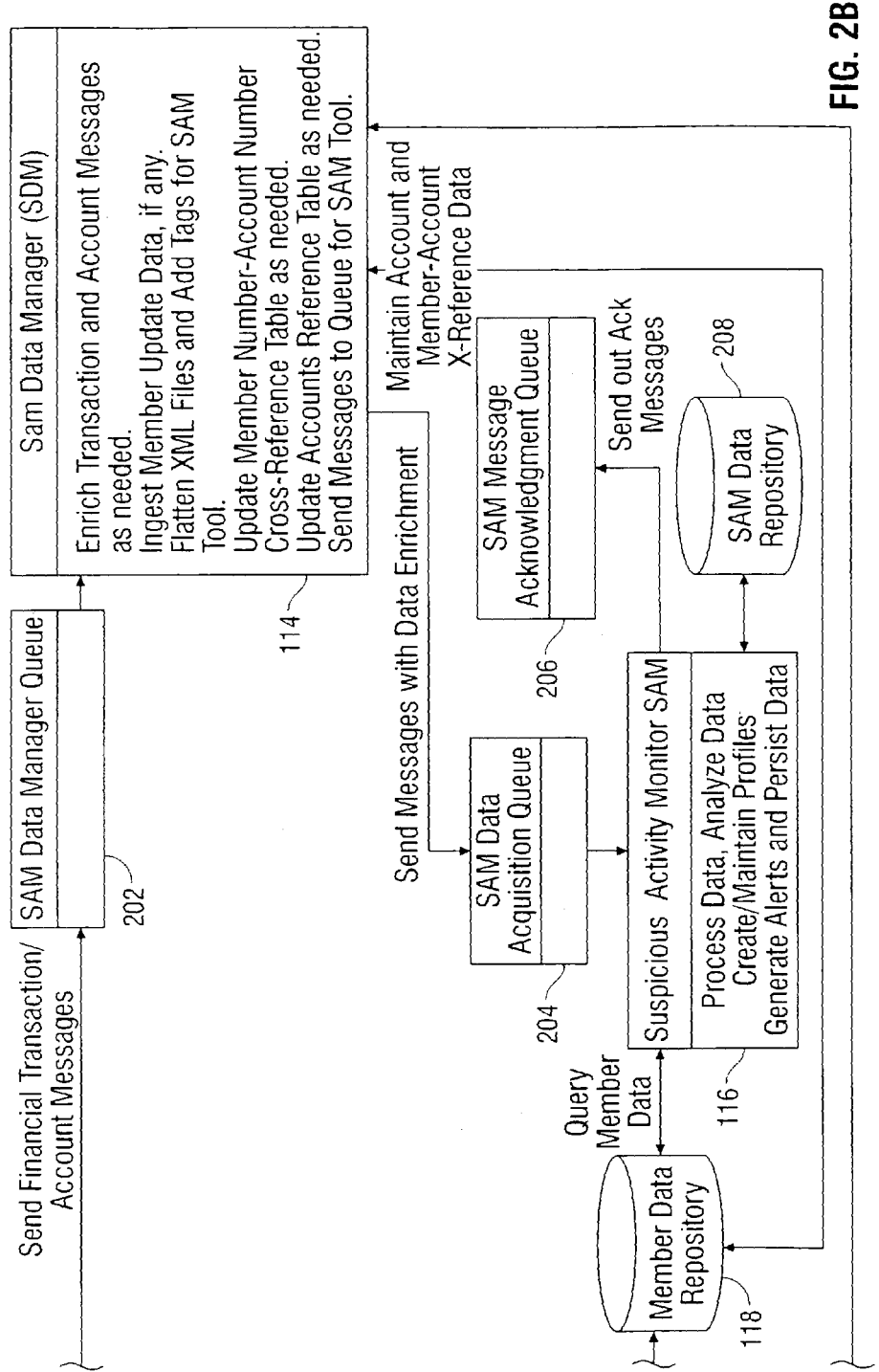

FIGS. 2A & 2B illustrate the flow of messages through the messaging infrastructure 100 of the disclosed embodiments in more detail. As can be seen, the message flow may begin with capture of transaction data that are generated from a source system 200, such as one of the financial services of the integrated financial services company. Next, the publisher for the financial service (see FIG. 1) may convert the captured transaction data to an XML message using the appropriate message specifications from Tables 3.1 through 3.6. The standardized XML message may then be published to the message broker 112 where further processing may be performed, if necessary, to transform the XML message into an enterprise-standard message format. The message broker 112 may also filter published messages if necessary based on their envelope parameters, for example, to separate out financial transaction and account maintenance messages from other messages not subscribed to by the SAM data manager 114. The message is thereafter sent to an acquisition queue 202 where it may eventually be provided to the SAM data manager 114.

At the SAM data manager 114, the financial transaction and account maintenance messages may be enhanced or enriched (e.g., "99999" zip code changed to "99999-4444") as needed by the SAM tool 116 in a manner known to those having ordinary skill in the art. The SAM data manager 114 may then process any member updates, flatten the XML files if needed (e.g., where hierarchical XML files are not supported), and add any tool-specific tags required by the SAM tool 116 to the enriched financial transaction and account maintenance data. The SAM data manager 114 may thereafter update member-account data (e.g., by updating a member-account cross-reference table) as needed, as well as account data (e.g., by updating an account table) as needed. Next, the SAM data manager 114 may send the enriched financial transaction and account maintenance data in SAM messages to a SAM data acquisition queue 204 where they may be eventually forwarded to the SAM tool 116. At this time, the SAM data manager 114 may also forward any changes in account and member data that were detected in the messages to the member data repository 118. Such an arrangement allows the SAM tool 116 to operate as it was originally designed and in accordance with its intended purpose without having to make any significant changes to the SAM tool 116.

Transaction data that is provided in batches rather than in real time may also be processed by the SAM data manager 114. Referring still to FIGS. 2A & 2B, batch updates from, for example, the enterprise integration area 120 may first be converted to database updates using a data integration tool 210, such as Informatica Corp.'s data integration software. The batch updates may then be sent, for example, on a nightly basis to the SAM data manager 114 and also used to update the member data repository 118. The SAM data manager 114 may thereafter parse the batch file, create SAM messages for the batch updates in the manner described above, add the appropriate tool-specific tags, and send them to the SAM data acquisition queue 204 where they may be subsequently forwarded to the SAM tool 116 for processing.

As mentioned above, the SAM tool 116 may process the financial transaction and account maintenance messages to detect any suspicious activities substantially in real time. Operation of the SAM tool 116 is generally well known to those having ordinary skill in the art and will not be described here except to say that the SAM tool 116 may send acknowledgment or confirmation of possibly fraudulent financial transaction and/or account maintenance activity being detected to a SAM message acknowledgment queue 206. The acknowledgment messages may then be routed to appropriate systems and/or personnel of a financial services company for investigation and follow-up as needed. The SAM tool 116 may thereafter update its own data repository 208, as well as the member data repository 118 in some embodiments, with any new data from the transaction and account maintenance messages.

Figure 3A:
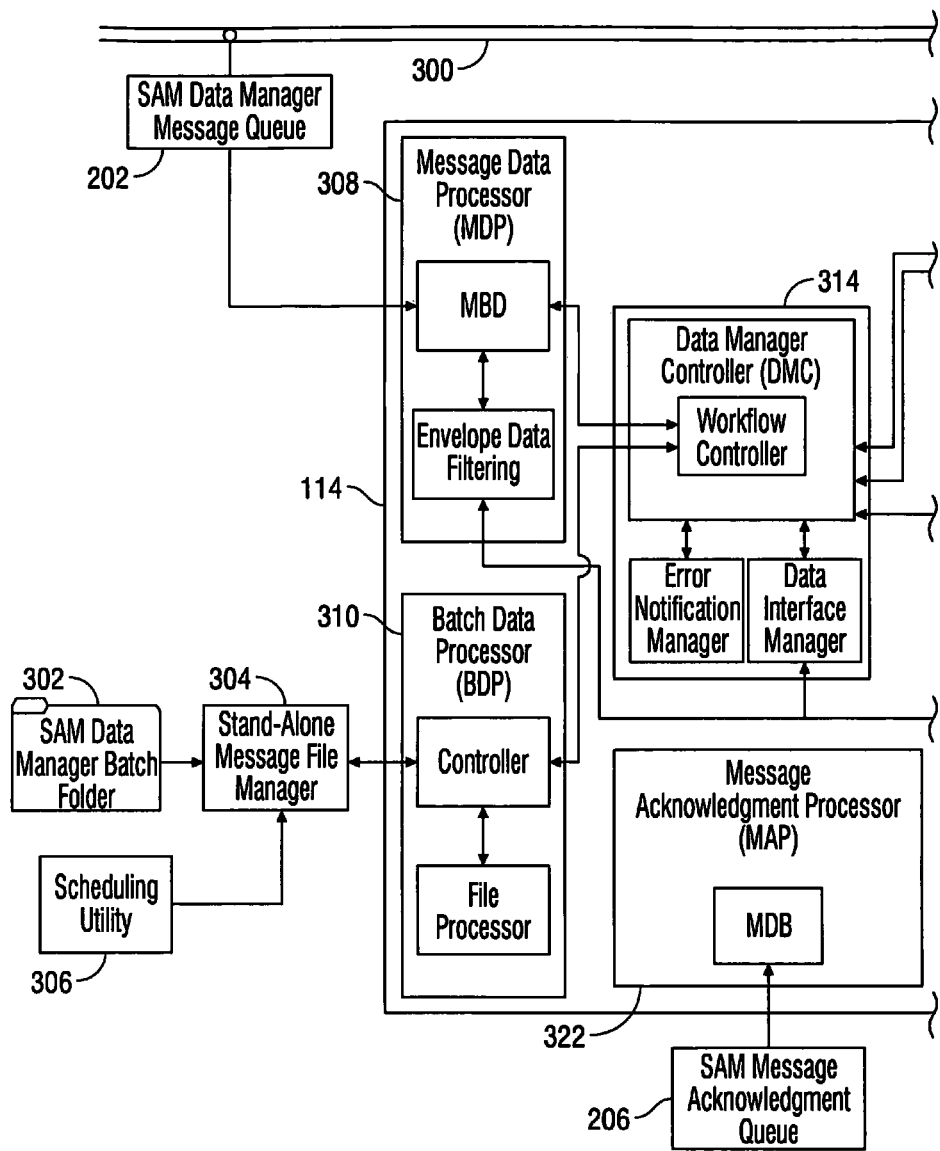
FIGS. 3A & 3B illustrate an exemplary architectural overview of the messaging infrastructure according to the disclosed embodiments.
Figure 3B:
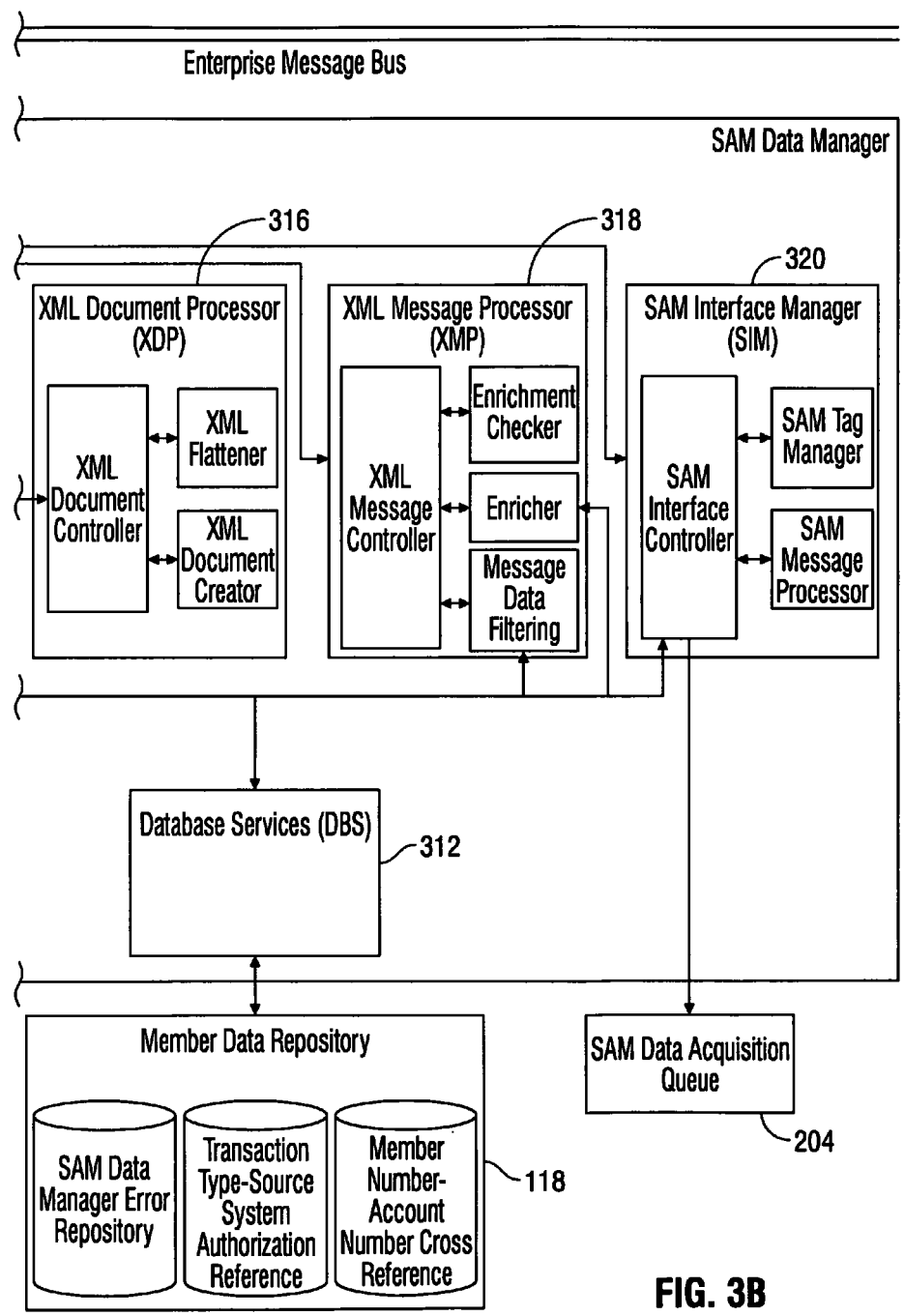

FIGS. 3A & 3B illustrate the SAM data manager 114 according to the disclosed embodiments in more detail. As can be seen, an enterprise message bus 300 may carry published transaction and account maintenance messages to which the SAM data manager 114 may subscribe. These published messages may be provided to the SAM data manager 114 via the SAM data manager queue 202 substantially in real time (e.g., where a financial service makes the data available substantially in real time). The SAM data manager queue 202 is thus the subscriber in this example. Batch transaction data, on the other hand, may be provided from a batch file folder 302 that temporarily holds the batch files and a message file manager 304 that operates to check the batch file folder 302 for updates and retrieve the updates into the SAM data manager 114. A scheduling utility 306, such as Control-M from BMC Software, and the like may be used to schedule the checks for the batch updates. The SAM data manager 114 may then process these messages using a number of functional components, some of which may comprise one or more functional subcomponents.

In some embodiments, the SAM data manager 114 itself may comprise a message data processor (MDP) 308 that functions to process the various transaction (e.g., financial, administrative, etc.) messages published on the enterprise bus 300. To this end, the message data processor 308 may include, for example, a Java-based message driven bean (MDB) that allows the SAM data manager 114 to process messages asynchronously, and an envelope data filtering function that allows the SAM data manager 114 to filter for predefined types of transaction and account messages, if any, by checking the message envelopes. The envelope data filtering function may also look up various data and information in the member data repository 118 via a database service 312 of the SAM data manager 114 as needed to filter the messages. This allows the SAM data manager 114 to perform an initial check of the published transaction messages in order to ensure that they are the types of transaction messages that would be useful for the SAM tool 116 to process based on one or more predefined criteria.

In addition to the published transaction messages, the SAM data manager 114 may also process transaction data that is received in batches. Thus, the SAM data manager 114 may include a batch data processor (BDP) 310 that functions to process the batch transaction data. The batch data processor 310 may include, for example, a file processor for processing the batch data files as needed in order for the data therein to be useful to the SAM data manager 114. In one implementation, the file processor may perform its function by parsing the batch data files into separate transactions, for example, each line of the batch file making up one transaction, and the content of that line making up the data for that transaction. The file processor may then organize or otherwise arrange the data in conformance with the format of Tables 3.1 through 3.6, for example, by using a look-up table. A controller may also be provided for controlling the parsing/processing and communicating of the processed batch data files to other functional components in the SAM data manager 114. The controller is generally responsible for sending and receiving of batch data files to and from the file processor as well as between the batch data processor 310 and other functional components of the SAM data manager 114.

One of these other functional components of the SAM data manager 114 may be a data manager controller (DMC) 314 that functions to control the flow of data messages through the SAM data manager 114. To this end, the data manager controller 314 may include a workflow controller that directs the movement of the transaction messages between the various functional components (described further below) of the SAM data manager 114. As each functional component completes its assigned task, it may return a version of the transactional messages to the workflow controller, which subsequently directs the transactional messages to the next functional component.

Any errors that may be returned by the other functional components may be logged by an error notification manager of the data manager controller 314, which may thereafter send the error to a predefined system and/or person for handling. This arrangement provides centralized error processing for the various functional components of the SAM data manager 114. The data manager controller 314 may also include a data interface manager that functions, among other things, to look up and/or store various member and account data in the member data repository 118 as needed. In some embodiments, a database service 312, which may be a JDBC (Java Database Connectivity) database service, may be provided to interface the data interface manager to the member data repository 118. It is of course possible for each functional component to simply forward its version of the transactional messages to the next functional component, though this arrangement would require each functional component to provide its own error notification manager and data interface manager.

In some embodiments, the workflow controller of the data manager controller 314 may send the published transaction messages to an XML document processor (XDP) 316 of the SAM data manager 114. The XML document processor 316 may function to process the published transaction messages (in embodiments where the message are in XML form) to create standard XML documents with the transaction data from the transaction messages using a predefined XML document structure. To this end, the XML document processor 316 may include an XML document creator for creating the standard XML documents from the transaction messages. In some embodiments, the XML document creator may create the standard XML documents by placing the data into predefined element containers and applying predefined tags (e.g., CDATA) to the data. The XML document processor 316 may also include an XML flattener that removes any hierarchy in the transaction data if needed (e.g., where such hierarchy in the data are not supported by the SAM tool 116). An XML document controller may further be present for directing the flow of the transaction messages to and from the XML document creator and the XML flattener and subsequently sending the standard XML documents back to the data manager controller 314.

In some embodiments, the data manager controller 314 may also send the published transaction messages to an XML message processor (XDP) 318 of the SAM data manager 114 to enrich the transaction messages (or XML documents or containers if the transaction messages were sent to the XML document processor 316 first). For its part, the XML message processor 318 may include an enrichment checker that may check whether enrichment of any transaction data (e.g., 2-digit state code changed to full state name, etc.) is needed depending on the data format preferred by the SAM tool 116. Such enrichment may then be performed by an enricher in the XML message processor 318 in a manner known to those of ordinary skill in the art. The enricher may look up member and account data from the member data repository 118 via the database service 312 as needed to perform the enrichment.

A message data filtering function may also be provided for filtering the transaction data to see whether a given transaction is of the type that would be beneficial for the SAM tool 116 to process. For example, transactions involving less than a few dollars (e.g., $1.00) may not need to be processed by the SAM tool 116. Like the enricher, the message data filtering function may also interact with the member data repository 118 via the database service 312 as needed to perform the filtering. An XML message controller may be provided for controlling movement of the transaction messages (or standard XML documents) to and from the enrichment checker, enricher, and message data filtering function, and subsequently sending the enriched transaction messages (or standard XML documents) back to the data manager controller 314.

The data manager controller 314 may thereafter send the standard XML documents to a SAM interface manager (SIM) 320 of the SAM data manager 114. The SAM interface manager 320 basically interfaces the SAM data manager 114 to the SAM data acquisition queue 204 of the SAM tool 116. Thus, the SAM interface manager 320 may send the standard XML documents to the SAM data acquisition queue 204 as SAM messages and may also add any specific tags that may be needed by the SAM tool 116 around one or more data fields of the SAM messages. To this end, the SAM interface manager 320 may include a SAM message manager that may determine the type of transaction that is being sent to the SAM tool 116 (e.g., monetary, administrative, etc.) and hence the type of tags needed to add to the SAM messages. A SAM tag manager of the data manager controller 314 may then add the SAM tool-specific tags to the SAM messages as needed in a manner known to those of ordinary skill in the art. Additionally, a SAM interface controller may be provided for controlling movement of the SAM messages to and from the SAM message processor and SAM data manager, and subsequently sending the SAM messages to the SAM data acquisition queue 204. The SAM interface controller may also function to look up and/or store various member and account data in the member data repository 118 as needed via the database service 312.

Finally, a message acknowledgment processor 322 having, for example, a Java-based message driven bean (MDB), may also be present in the SAM data manager 114 for receiving and processing acknowledgments or confirmations from the SAM message acknowledgment queue 206 of the SAM tool 116. Such acknowledgments may confirm that the SAM tool 116 has detected possibly fraudulent activity. The message acknowledgment processor 322 may thereafter send the knowledge or confirmations to the appropriate systems and/or personnel of a financial institution for handling.

FIG. 4 provides a summary in table form of the exemplary publishers and interfaces of the messaging infrastructure 100 according to the disclosed embodiments. In FIG. 4, the first column, entitled Source System, lists the various financial services from which transaction and account messages may be monitored by the SAM tool 116. These financial services may include wire transfer services (FTW), checking and savings account services, brokerage services, mutual fund services, electronic payment services, and the like.

The second column, entitled Data Type, lists the various types of data that may be generated by the financial services listed in the first column. These types of data may include, for example, financial transactions, account changes, account master reconciliations, rejections, customer data, and the like. The third column, entitled Transport, lists the transport mechanism used to provide the various data types. In accordance with the disclosed embodiments, the primary transport mechanism used in the messaging infrastructure 100 herein is the publish-subscribe system. However, some financial services also use batch updates to transmit their transaction data. The last column, entitled Approach, describes the frequency with which transaction data is published and/or transmitted for the various financial services. As can be seen, some financial services may publish, transmit, or otherwise make available their transaction data in real time or at predefined intervals, for example, every 15 minutes, every 30 minutes, at the end of the day, weekly, and so forth.

Figure 5:
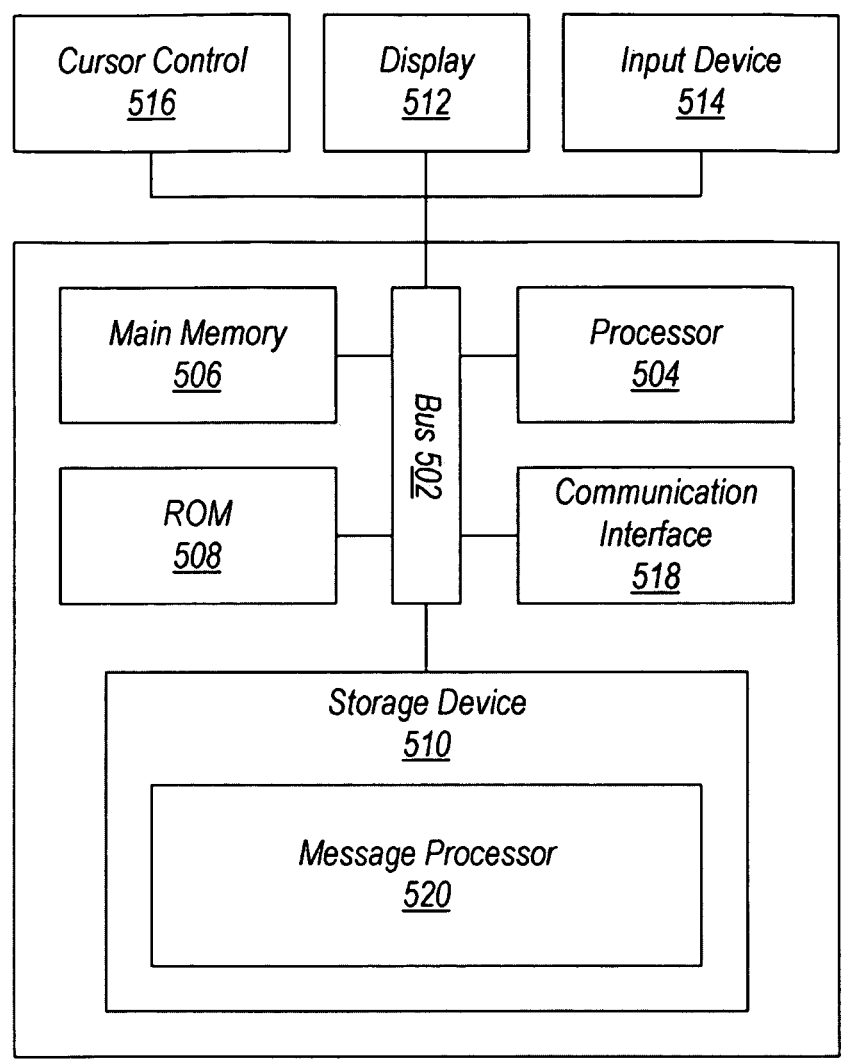
FIG. 5 illustrates an exemplary system for implementing a message creator that may be used in conjunction with a publisher according to the disclosed embodiments.

FIG. 5 illustrates an example of a computing system 500 that may be used by one of the financial services to convert financial and account maintenance data into the exemplary messaging format specified in Tables 3.1 through 3.6. As can be seen, the computing system 500 may be any suitable computing system, such as a desktop, server, workstation, mainframe, and the like. The computing system 500 typically includes a bus 502 or other communication mechanism for communicating information and a processor 504 coupled with the bus 502 for processing information. The computing system 500 may also include a main memory 506, such as a random access memory (RAM) or other dynamic storage device, coupled to the bus 502 for storing computer-readable instructions to be executed by the processor 504. The main memory 506 may also be used for storing temporary variables or other intermediate information during execution of the instructions to be executed by the processor 504. The computing system 500 may further include a read-only memory (ROM) 508 or other static storage device coupled to the bus 502 for storing static information and instructions for the processor 504. A non-volatile computer-readable storage device 510, such as a magnetic, optical, or solid state device, may be coupled to the bus 502 for storing information and instructions for the processor 504.

The computing system 500 may be coupled via the bus 502 to a display 512, such as a cathode ray tube (CRT) or liquid crystal display (LCD), for displaying information to a user. An input device 514, including, for example, alphanumeric and other keys, may be coupled to the bus 502 for communicating information and command selections to the processor 504. Another type of user input device may be a cursor control 516, such as a mouse, a trackball, or cursor direction keys for communicating direction information and command selections to the processor 504, and for controlling cursor movement on the display 512. The cursor control 516 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 504 and/or other components. Similarly, the term "computer-readable medium" refers to any storage medium that may be used to store the computer-readable instructions. Such a medium may take many forms, including, but not limited to, non-volatile media, volatile media, and transmission media. Transmission media may include coaxial cables, copper wire and fiber optics, including wires of the bus 502, while transmission may take the form of acoustic, light, or electromagnetic waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The computing system 500 may also include a communication interface 518 coupled to the bus 502. The communication interface 518 typically provides a two way data communication coupling between the computing system 500 and the network 110. For example, the communication interface 518 may be an integrated services digital network (ISDN) card or a modem used to provide a data communication connection to a corresponding type of telephone line. As another example, the communication interface 518 may be a local area network (LAN) card used to provide a data communication connection to a compatible LAN. Wireless links may also be implemented. Regardless of the specific implementation, the main function of the communication interface 518 is to send and receive electrical, electromagnetic, optical, or other signals that carry digital data streams representing various types of information.

In accordance with the disclosed embodiments, a message processor 520, or more precisely, the computer-readable instructions therefor, may reside on the storage device 510. The message processor 520 may be integrated as part of the publisher for a given financial service (see FIG. 1), or it may be a stand-alone application that is operated in conjunction with the publisher. In either case, the message processor 520 primarily functions to create messages that incorporate the specific data and codes generated by the financial service into the fields specified in Tables 3.1 through 3.6 above. Such a message may then be published by the publisher and subsequently consumed by any subscriber that has subscribed to such messages. It is expected that each financial service may have its own version of the message processor 520 customized for the particular requirements (e.g., backend systems, data formats, etc.) of the financial service. This allows the financial service to continue operating as normal with little or no change to its backend systems or business rules and procedures.

Figure 6:
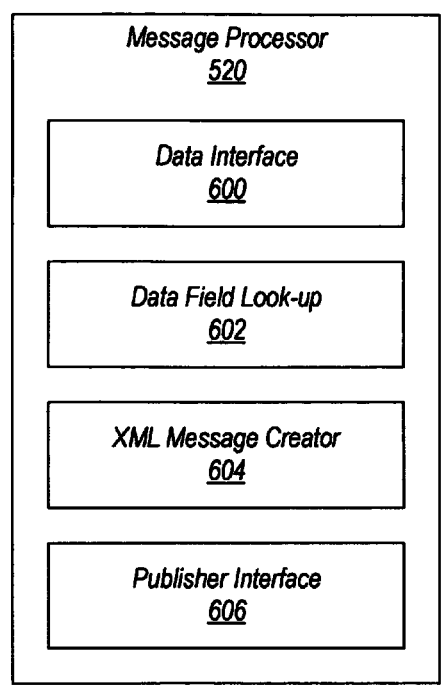
FIG. 6 illustrates an exemplary application for creating messages that may be used in conjunction with a publisher according to the disclosed embodiments.

FIG. 6 illustrates the message processor 520 in more detail according to the disclosed embodiments. As can be seen, the message processor 520 may include a data interface 600, a data field look-up module 602, an XML message creator 604, and a publisher interface 606. Other components in addition to these functional components 600-606 may also be present in the message processor 520 without departing from the disclosed embodiments. Note that although the message processor 520 is described herein with respect to transaction messages, including monetary and administrative transaction messages, the teachings and principles of the invention may be fully applicable to other types of transactions. As an example, a customer logging into a company's Web site may be a type of transaction, and the data resulting from that transaction may be incorporated into a transaction message that may then be published by a publisher for the company.

In general, the data interface 600 may operate to take in transaction data from a financial service thereof. In some instances, this may involve the data interface 600 downloading the transaction data from the financial service, for example, according to a predefined schedule (e.g., every 15 minutes, every 30 minutes, hourly, etc.). In those instances, the data may be made available by the financial service, for example, in a transaction log that captures the various transactions conducted via the financial service. The data interface 600 may then access the transaction log to retrieve the transaction data. In other instances, however, the data interface 600 may receive the transaction data from the financial service substantially in real time. For example, as each transaction occurs, the financial service may send an electronic message to the data interface 600 containing the details of the transaction.

Once the transaction data has been taken in, the data field look-up module 602 may process the data. For example, the data field look-up module 602 may determine whether the transaction underlying the data is a monetary transaction, an administrative transaction, or the like. The data field look-up module 602 may then scan the transaction data to identify the individual items of data (e.g., name, address, amount of transaction, etc.). The scanning may be performed once for each type of transaction and the results saved and reused for subsequent transactions of the same type, or it may be performed for every transaction. The data field look-up module 602 may thereafter map the identified items of data to the corresponding fields specified in Tables 3.1 through 3.6 above. Such mapping may be done, for example, with the aid of a look-up table (not expressly shown) that lists the individual items of data generated by the financial service and the corresponding fields specified in Tables 3.1 through 3.6. Such a look-up table may be defined by knowledgeable personnel of the financial service and modified from time to time as needed. In some embodiments, Tables 3.1 through 3.6 themselves may be used as look-up tables.

The XML message creator 604 may then create an XML message using the individual items of transaction data. In one embodiment, the XML message creator 604 may use one of several templates (not expressly shown) to create the XML message. The particular form of template used may depend on whether the transaction is a monetary transaction or an administrative transaction, and the particular type of monetary (e.g., deposit, payment, etc.) or administrative transaction (e.g., change username and/or password, add account holder, etc.). Such a template may contain predefined XML tags for the various fields specified in Tables 3.1 through 3.6. The XML message creator 604 may then insert the individual items of transaction data in between the corresponding XML tags of the template. It is also possible of course for the XML message creator 604 to generate an XML message from scratch if needed. In any event, by conforming the transaction data to the fields specified in Tables 3.1 through 3.6, standardized or uniform transaction messages may be sent to the SAM tool 116 from multiple different financial services using a common transport mechanism.

Once a transaction message has been created, the publisher interface 606 may operate to call or otherwise invoke the publisher of the financial service to publish the transaction messages. The publisher may then publish the transaction message to all subscribers in a manner known to those having ordinary skill in the art with little or no modification to the publisher. As mentioned above, commercially available public-subscribe systems that may be used may include Message Broker from IBM Corp., MSMQ from Microsoft Corp., SonicMQ from Progress Software Corp., and the like.

Figure 7:
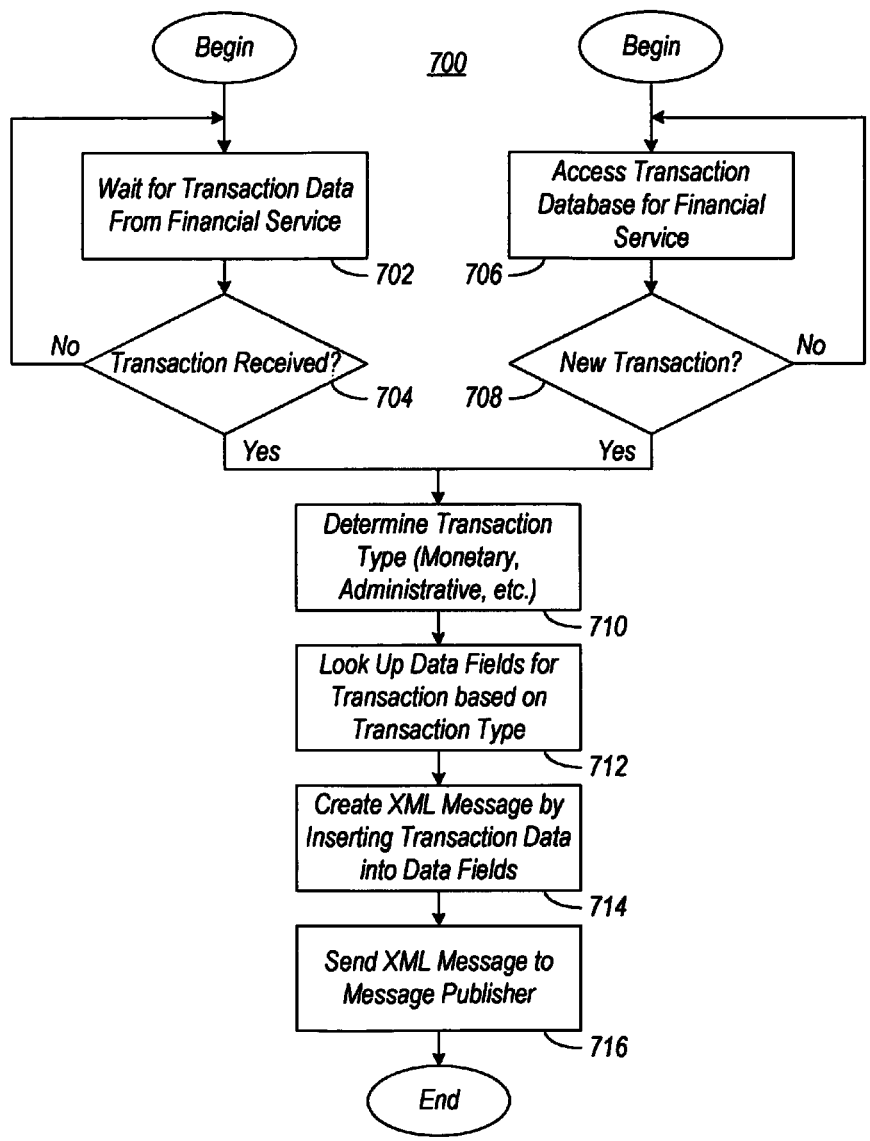
FIG. 7 illustrates an exemplary flowchart for creating messages that may be used in conjunction with a publisher according to the disclosed embodiments.

Turning now to FIG. 7, general guidelines are shown for a method 700 of transforming financial and account maintenance data into the exemplary messaging format specified in Tables 3.1 through 3.6. As can be seen, the method 700 may begin at 702 where the message processor 520 waits for transaction data to be received from a financial service. A determination may be made at 704 as to whether that transaction data has been received. Alternatively, the method 700 may begin at 706 where the message processor 520 may access a transaction database (e.g., transaction log, etc.) for the financial service, and at 708 where a determination may be made as to whether there are any new transactions in the transaction database. It is of course possible for both of the above approaches to be incorporated into the message processor 520 without departing from the scope of the disclosed embodiments.

At 710, the message processor may determine the type of transaction involved based on the transaction data, including financial transactions, administrative transactions, and the like. At 712, the message processor 520 may map the individual items of data in the transaction to look-up the corresponding fields specified in Tables 3.1 through 3.6., for example, by using a look-up table. At 714, the message processor 520 may create an XML message by inserting the various items of data into their corresponding data fields by using, for example, one or more message templates. Finally, the message processor 520 may send the XML message to a publisher for publication by calling or otherwise invoking the publisher.

As alluded to above, in addition to monitoring and detecting suspicious activities, federal regulations require that certain suspicious activities also be reported to the Financial Crimes Enforcement Network (FinCEN) via submission of a suspicious activity report (SAR). The requirements for submitting a SAR, however, are strict and can be difficult to comply with, particularly given recent increases in the number of online financial transactions and, hence, opportunities for fraud and money laundering. Accordingly, the disclosed embodiments also provide a SAR workflow for generating SAR deadlines and submission reminders in order to facilitate compliance with FinCEN requirements.

Figure 8:
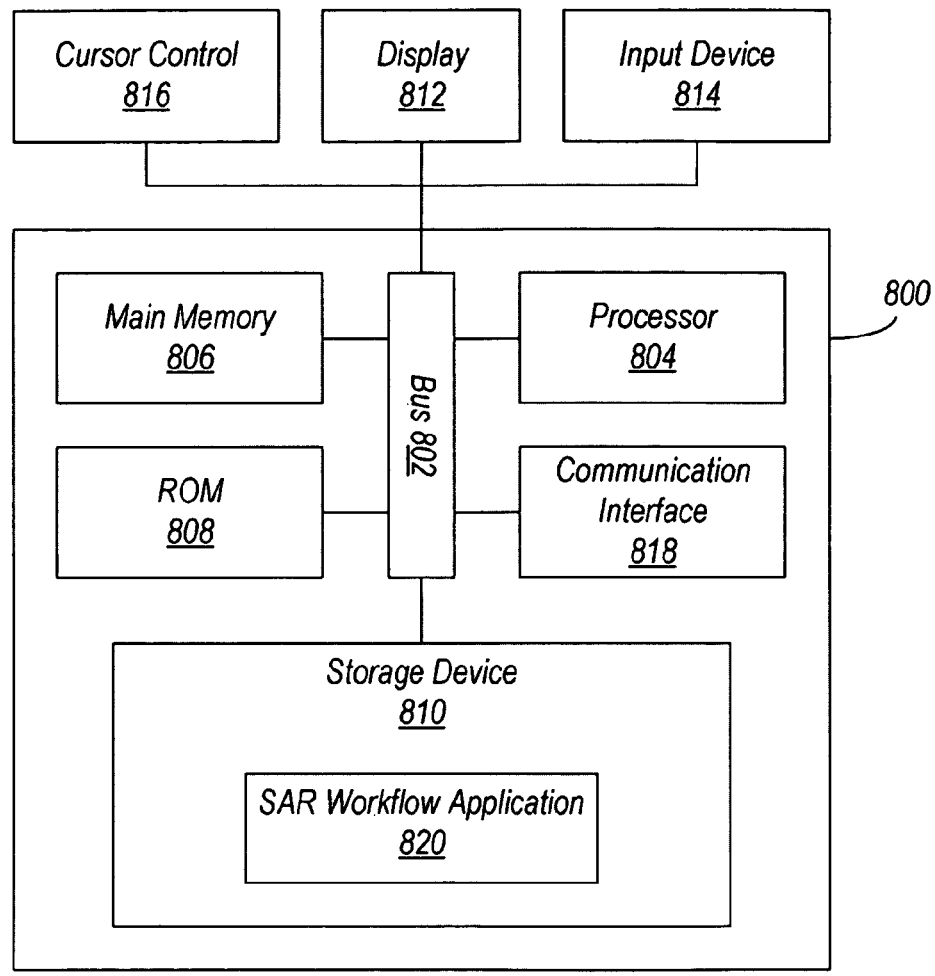
FIG. 8 illustrates an exemplary system for implementing a suspicious activity report workflow according to the disclosed embodiments.

FIG. 8 illustrates an example of a computing system 800 that may be used to assist fraud prevention personnel of a financial services company in complying with FinCEN reporting requirements. As can be seen, the computing system 800 may be similar to the computing system 500 of FIG. 5 insofar as it may include a bus 802, a processor 804, a main memory 806, a read-only memory (ROM) 808, a storage device 810, a display 812, an input device 814, a cursor control 816, and a communication interface 818. These components 802-818 may be similar to their counterparts in the computing system 500 of FIG. 5 and are therefore not described in detail here.

In accordance with the disclosed embodiments, a SAR workflow application 820, or more precisely, the computer-readable instructions therefor, may reside on the storage device 810. The computer-readable instructions for the SAR workflow application 820 may then be executed by the processor 804 and/or other components of the computing system 800 to automatically track and provide reminders to suspicious activity investigators and/or their supervisors of impending SAR submission deadlines. In some implementations, the SAR workflow application 820 may also provide reminders to investigators and/or their supervisors of action items to be completed, reviews to be conducted, approvals to be obtained, and so forth. This results in a standardized process for developing and submitting SARs that can assist financial institutions in satisfying FinCEN reporting requirements. Following is a description of an exemplary implementation of the SAR workflow application 820 according to the disclosed embodiments.

Figure 9:
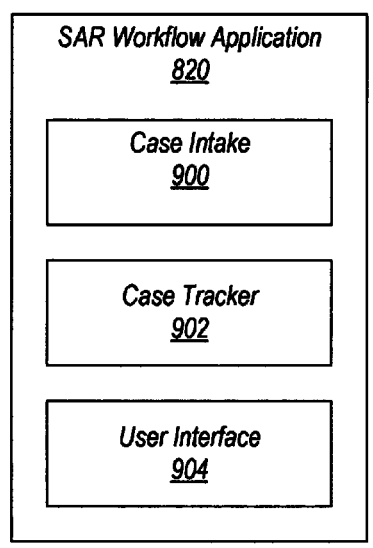
FIG. 9 illustrates an exemplary application for implementing a suspicious activity report workflow according to the disclosed embodiments.

Referring to FIG. 9, in one implementation, the SAR workflow application 820 may comprise a number of functional components, including a case intake module 900, a case tracker module 902, and a user interface module 904. These functional components may be software components written in a suitable programming or scripting language, hardware components encoded with suitable firmware instructions, or a combination of both. It should be noted that while several discrete components 900-904 are shown in FIG. 9, those having ordinary skill in the art will understand that one or more of these functional components may be combined into a single component and that any individual component may be divided into several constituent components as needed without departing from the scope of the disclosed embodiments.

In general, the case intake module 900 is configured to receive data pertaining to suspicious activity transactions, such as the amounts, individuals, entities, and/or types of transactions involved. Such suspicious activity transaction data may be obtained through the SAM tool 116 (see FIG. 1), or it may come from other sources that monitor and detect suspicious activities. Typically, the data is entered manually by a suspicious activity investigator or detection analyst via a set of predefined data entry fields, but it is also possible to download the data directly to the case intake module 900 from the SAM tool 116 or other monitoring and detecting sources in some embodiments. The case intake module 900 also allows the suspicious activity investigator or detection analyst to relate, link, or otherwise associate multiple suspicious transactions to one another.

The case intake module 900 may also monitor the cumulative total amount involved in any given set of related transactions to determine if the amount meets or exceeds a threshold amount (e.g., $5,000) for FinCEN reporting requirements or some other criteria. If so, then the case intake module 900 may automatically open a SAR record for the set of transactions. The SAR record is basically a compilation of the information that is relevant and needed to complete a SAR. Otherwise, the case intake module 900 may simply continue to monitor the cumulative total amount involved as updates and additional transactions are added to the case. For cases that already have an existing SAR record (e.g., cases have that are already under investigation), no SAR record is created, but the case intake module 900 may update or otherwise associate any new transactions with the existing SAR record. In some embodiments, a SAR database (not expressly shown), which may be a relational database or other suitable database, may reside either on the computing system 800 or on a separate computing system, or both, for storing the SAR records.

The case tracker module 902 is generally responsible for recording discovery dates and calculating SAR submission deadlines for SAR cases and also for providing reminders of the SAR submission deadlines to case investigators and supervisors. The case tracker module 902 may also track and monitor any action items to be completed, reviews that needed to be conducted, and/or approvals that need to be obtained, and provide reminders to investigators and supervisors of same. In one implementation, the reminders may be in the form of pop-up windows, e-mail messages, voicemail messages and the like, that contain the deadlines, case information, actions to be taken, and any other information needed by investigators and supervisors (e.g., "10 days until deadline," "five days until deadline," etc.). If a date or deadline is missed, an alert message may be sent to the investigators and supervisors notifying them of the missed date or deadline. The case tracker module 902 may also generate reports that allow investigators and supervisors to track the progress and status of the various SAR cases.

The user interface module 904 generally allows investigators and supervisors to interact with the SAR workflow application 820. Thus, the user interface module 904 may provide a user interface that enables the investigators and supervisors to, for example, add transaction data to the cases as well as view information relevant to their respective SAR cases. The information may be generated in the form of reports that contain charts, tables, graphs, and the like. Such a user interface module 904 may operate via a graphical user interface, such as a Web browser, but a telephone interface or some other suitable interface may also be used. In some implementations, the user interface module 904 may also allow the investigators to request reviews and/or approvals, and perform other actions known by those having ordinary skill in the art in connection with development of a SAR.

In some embodiments, the features and functions of the SAR workflow application 820 may be implemented in the form of a graphical user interface. FIGS. 10A-10D show a simplistic implementation of a graphical user interface 1000 for purposes of illustrating the principles and concepts of the disclosed embodiments and not by way of limitation. The graphical user interface 1000 may be implemented using any suitable software application known to those having ordinary skill in the art. For example, the graphical user interface 1000 may be a Web-based application hosted on a Web server that can be accessed from any commercially-available Web browser over a network, or it may be a stand-alone application that is run locally on an individual computer. Those having ordinary skill in the art are capable of deriving other, more complex implementations without departing from the scope of the disclosed embodiments.

As can be seen in FIGS. 10A-10D, the graphical user interface 1000 may include a plurality of tabs, each tab being designed to support a different stage of the SAR workflow. For example, there may be a Detection tab 1002 that is designed to help detect whether one or more transactions may constitute a suspicious activity, a Pre-work tab 1004 that is designed to confirm needed items of information have been compiled prior to referral of the case to an investigator, an Investigation tab 1006 that is designed to facilitate investigation of the case and subsequent preparation of a SAR, and a Reports tab 1008 for generating different types of status and progress reports for the various SAR cases.

Referring first to FIG. 10A, the Detection tab 1002 may include a case number section 1010 that allows a user to retrieve a specific SAR case by its unique case number. A user ID section 1012 may also be present that shows the username or other identification of the specific user or users working on the case. A deadlines section 1014 shows the discovery date for the case, which is the date when it is initially determined that a suspicious activity is taking place, and a SAR submission deadline, which is the date when a SAR must be submitted to FinCEN in order to avoid a fine or penalty. The SAR submission deadline may be calculated automatically by the workflow application 820 using one or more FinCEN criteria and the data for the various transactions associated with the case. The discovery date and the SAR submission deadline are typically determined after a suspicious activity has been detected and therefore those fields are usually, but not always, blank on the Detection tab 1002.

In operation, suspicious activity detection analysts or other personnel trained and qualified to detect suspicious activity may access the user interface 1000 (e.g., by entering their usernames and passwords). The detection analysts may then initiate a case or retrieve an existing case and add one or more suspicious activity transactions to the case via a transactions section 1016. In one implementation, an Add Transaction button in the transactions section 1016 may be provided that the detection analysts may click to add a new transactions. Doing so may bring up a window (not expressly shown) containing a plurality of data fields which the detection analyst may use to enter, for example, the amounts involved in the transactions, the dates of the transactions, the individuals initiating the transactions, the entities conducting the transactions, and other transaction-related information. As mentioned above, this data may be provided by the SAM tool 116 or other sources that detect and monitor suspicious activity. In some embodiments, the detection analysts may also attach the actual reports, screen captures, log files, and the like for the transactions at this time. Once data entry is complete for a transaction, the transaction may be displayed as a hyperlink that the detection analysts (or others) may click on to retrieve the data and any attachments for the transaction.

If the total amount involved in a case exceeds the FinCEN threshold amount (e.g., $5,000) or some other criteria, the detection analysts may refer the case for investigation if they believe that a suspicious activity is taking place. A pre-work referral section 1018 may be provided to allow the detection analysts to refer the case for investigation, for example, by selecting a Pre-work Referral box. Selecting the Pre-work Referral box moves a case out of the detection queue and into a pre-work queue where a team of pre-work investigators may evaluate the case for completeness of information before assigning the case to an investigator. Until the Pre-work Referral box is selected, however, a case will remain in the detection queue, and hence the responsibility of the detection analysts, until it is manually terminated. This helps ensure that the detection analyst does not inadvertently ignore or otherwise forget about the case. In some embodiments, the SAR workflow application 820 may disable the Pre-work Referral box until the total amount involved in the case exceeds the FinCEN threshold amount (e.g., $5,000) or some other criteria.

Once the Pre-work Referral box is selected, the case can be viewed in the Pre-work tab 1004, as shown in FIG. 10B. Pre-work investigators may then work on the case from the Pre-work tab 1004 (e.g., after entering their usernames and passwords). In the embodiment shown here, the Pre-work tab 1004 includes the same case number section 1010, user ID section 1012, deadlines section 1014, and transactions section 1016. The pre-work investigator may then review a transaction by clicking on the hyperlink for that transaction. In addition, the Pre-work tab section 1004 may include an information verification section 1020 that is designed to assist the pre-work investigators verify the completeness of the information gathered for the case. Thus, for example, the verification section 1020 may provide a list of one or more items of information that the pre-work investigators may look for in the case. Such items of information may include, for example, the amounts involved in the transactions, the dates of the transactions, the individuals initiating the transactions, the entities conducting the transactions, and other transaction-related information. If an item of information is missing, then the pre-work investigators may select a Return to Detection box to send the case back to the detection queue for obtaining the missing item. If the items of information are present, then the pre-work investigators may select an Assignment box in the Verification section 1020 to refer the case for assignment to an investigator.

Selection of the Assignment box may cause the SAR workflow application 820 to move the case out of the pre-work queue and into an assignment queue. The SAR workflow application 820 may also set the current date as the discovery date at this time and calculate the SAR submission deadline. Based on current FinCEN requirements, the submission deadline may be 30 days from the discovery date if a suspect has been identified, or it may be 60 days from the discovery date if no suspect has been identified. The due date may not be extended beyond 60 days from the discovery date under any circumstances according to current FinCEN requirements. Other criteria may also be factored into the due date calculation, such as whether a mutual fund or brokerage was involved, whether the amount was greater than $5,000, or greater than $25,000, and so forth. For example, if a mutual fund or brokerage was involved, then the due date may not be more than 30 days from the discovery date regardless of whether a suspect has been identified.

Supervisors may then assign the case to one or more of several investigators, which moves the case out of the assignment queue and into the queue of the assigned investigator. The assigned investigator may then view the case via the Investigation tab 1006 (e.g., after entering his username and password). As with the previous tabs, the Investigation tab 1006 may include the same case number section 1010, user ID section 1012, deadlines section 1014, and transactions section 1016. The investigator may then review a transaction by clicking on the hyperlink for that transaction. In addition, the Investigation tab 1006 may include an action section 1022 that is designed to assist the investigators to investigate the case and develop information for the SAR. Thus, for example, the action section 1022 may provide a list of one or more action items that the investigators may complete for the case. The action items may be derived, for example, from best practices and procedures that have been accumulated by the investigators and detection analysts over time. In this way, a common or standard set of action items may be provided for each case that may help to promote efficiency and uniformity in the investigation of the cases and completion of the SARs.

Examples of action items in the action section 1022 may include determining (1) who is conducting the suspicious activity, (2) what instruments or mechanisms are being used to facilitate the suspect transactions, (3) when did the suspicious activity take place, (4) where did the suspicious activity take place, and/or (5) why does the investigator thinks the activity is suspicious. Other action items may include adding additional, more recent transactions (e.g., via the transactions section 1016), drafting a SAR narrative, and submitting the SAR to FinCEN, the completion of which (e.g., by entering the date of submission into the appropriate field) effectively closes the case. Note that if any of the action items results in a change or update to the data underlying the SAR submission deadlines, then the SAR workflow application 820 may automatically recalculate those deadlines as needed.

In some embodiments, the action section 1022 may also include one or more reviews and/or approvals that the investigator may obtain from a reviewer, supervisor, or other qualified personnel for the case. The reviews and/or approvals may be prerequisites for one or more action items such that the action items cannot be completed (i.e., they are disabled) until the reviews and/or approvals have been obtained. Such reviews and/or approvals may affect, for example, a SAR narrative, extension of a SAR submission deadline, termination of a case without submitting a SAR to FinCEN, and the like. As an example of the latter, an investigator may sometimes need to terminate a case, for example, by selecting a Cancel SAR box in the action section 1022, because it was discovered after further investigation that the transactions were involved in a family dispute and do not constitute a suspicious activity after all. Selection of an approval box moves the case out of the investigators queue and into the queue of the supervisor or other approver where it remains until either the approval is granted or the case is manually terminated.

Figure 10D:
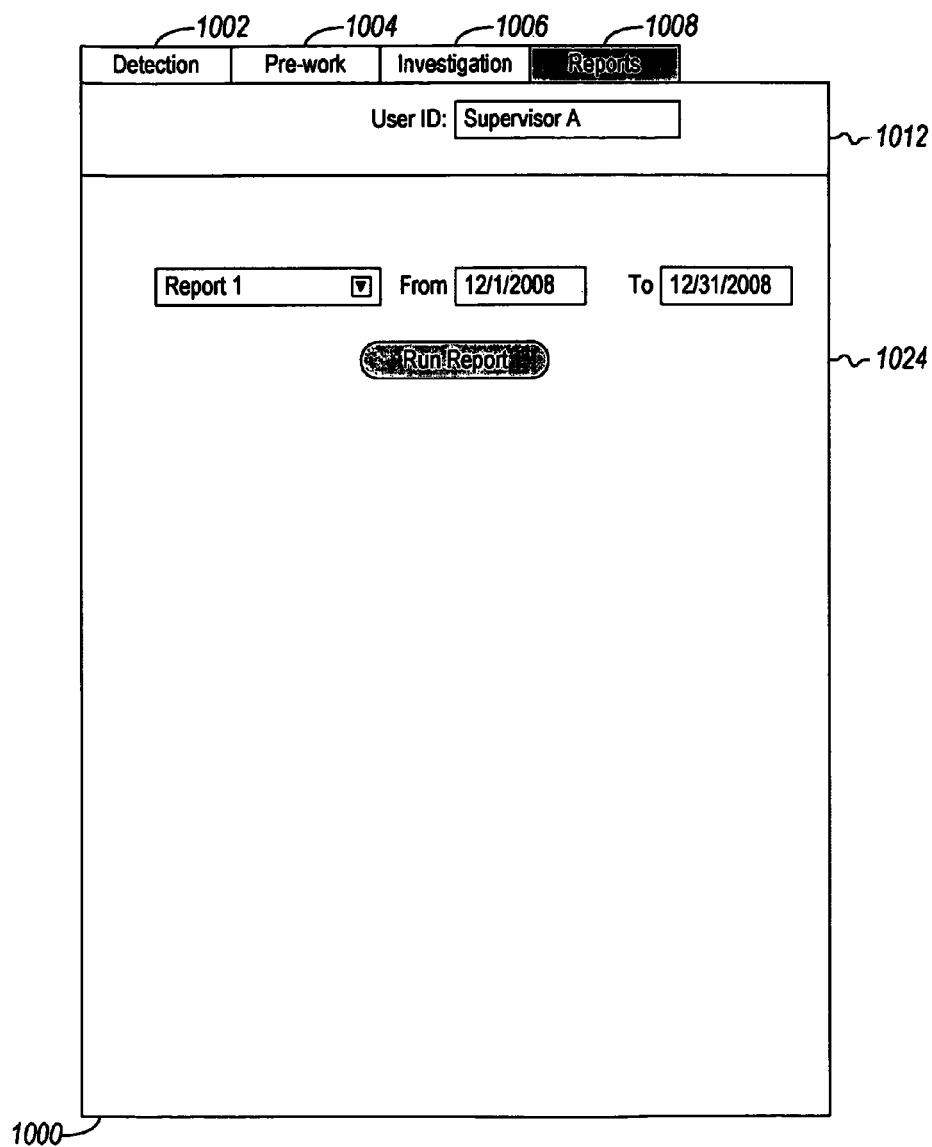

Finally, the Reports tab 1008 allows investigators and supervisors to request status and progress reports of the various SAR cases, as can be seen in FIG. 10D. The investigators and supervisors may request a report by selecting one of several predefined report types via one or more drop-down menus in a report selection section 1024 of the Reports tab 1008, along with the date ranges for the reports. Such reports may include, for example, SAR cases completed within a certain timeframe, SAR cases with missed submission deadlines, the workloads of various investigators, and the like. The SAR workflow application 820 may then generate the requested reports using database query techniques known to those having ordinary skill in the art. In some embodiments, the particular type of report available may be restricted depending on whether the requester is an investigator for a supervisor.

FIG. 11 illustrates an example of a report 1100 that may be available to an investigator. In the example shown here, the report 1100 may be a listing of cases assigned to an investigator along with the SAR deadlines therefor and the statuses thereof. Such a report 1100 may include, for example, a Case # column listing the various SAR cases currently being handled by the investigator and a SAR Deadline column listing the SAR deadline for each case. A Status column may also be provided for indicating the current status of each of the SAR cases. Examples of statuses may include: Completed (i.e., the SAR has been filed), Awaiting Approval (i.e., the case has been referred to a supervisor or other approver), In Progress (i.e., one or more action items are outstanding), and the like. The investigator may then view the details of each SAR case by selecting (e.g., double-clicking) the case number to open the graphical user interface 1000 (see FIGS. 10A-10D).

FIG. 12A is an example of a report 1200 that may be available to supervisors. The report 1200 may display a list of currently pending cases and the statuses of each case in an assignment queue to be assigned by a supervisor to an investigator. As can be seen, the exemplary report 1200 in FIG. 12A is composed of several columns, including a Case # column that lists the currently pending SAR cases, a Pre-work column that shows the pre-work statuses of each case, an Assigned column that shows which investigators the cases are assigned to, and a Status column that shows the status of each case. In some embodiments, the supervisor may also assign any unassigned cases at this time by selecting an investigator from a drop-down menu in the Assigned column. The supervisor may also view the details of a case by selecting (e.g., double-clicking) the case to open the graphical user interface 1000.

FIG. 12B illustrates an example of another supervisor report 1202 that may be generated by the SAR workflow application 820. This particular report 1202 may provide a summary of the workloads of the different investigators currently being supervised by a given supervisor. In one embodiment, the report 1202 may include an Investigator column that displays the investigators who are under the supervisor and a Cases column showing the number of cases being handled by each investigator. The report 1202 may also include a Completed column for indicating the number of cases that have been completed and a Compliance column for indicating the percentage of an investigator's cases that is in compliance with FinCEN or other requirements.

Figure 13:
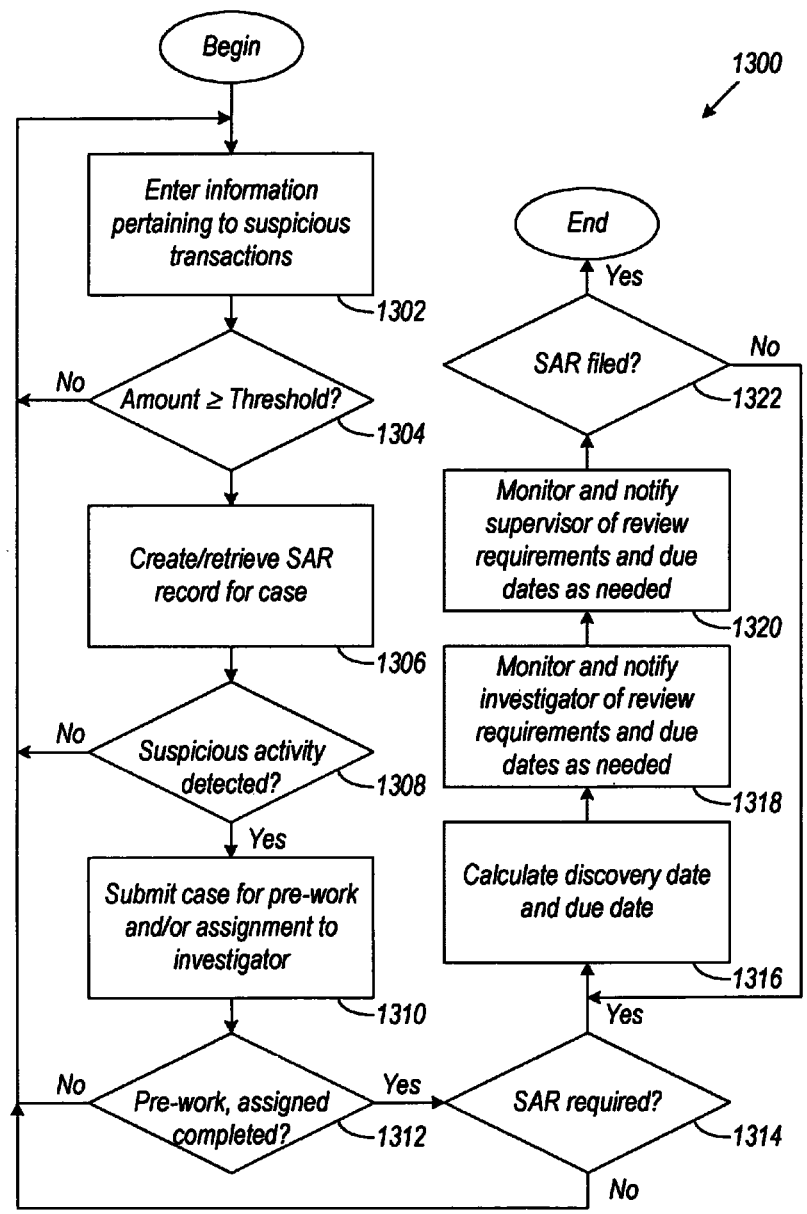
FIG. 13 illustrates an exemplary suspicious activity report workflow according to the disclosed embodiments.

Thus far, specific embodiments have been described for implementing a SAR workflow that may be used to facilitate compliance with FinCEN submission requirements according to the disclosed embodiments. Illustrated now in FIG. 13 are general guidelines for an exemplary SAR workflow 1300 according to the disclosed embodiments. As can be seen in FIG. 13, the SAR workflow 1300 may begin with entry of information at 1302 for one or more transactions related to a suspicious activity, usually by a team of suspicious activity detection analysts. The transactions may be ones that have been flagged by the SAM tool 116 and subsequently forwarded to the detection analysts (e.g., via the SAM acknowledgment processor 322 shown in FIGS. 3A & 3B), or they may be transactions that came to the attention of the analysts through other means.

In one embodiment, a determination may be made at 1304 as to whether the amounts involved in the transactions add up to an amount that is greater than a certain threshold amount (e.g., $5,000, $2,500, etc.). If yes, then a SAR record may be opened (or retrieved if a SAR record already exists) at 1306 for the case. If no, then the SAR workflow 1300 may continue to monitor the case as additional information is added from related transactions until the threshold amount is reached or until the case expires after a predefined amount of time (e.g., one month, six months, a year, etc.).

Next, a determination is made at 1308 as to whether the case has reached "detection" status, meaning that a suspicious activity has been confirmed in the case by either a detection analyst or other qualified personnel. This ensures that an actual suspicious activity has been detected before the case is progressed further through the SAR workflow 1300. If no, then the workflow 1300 may continue to monitor the case. If yes, then at 1310 the case may be submitted for pre-work review by qualified personnel to determine whether certain required items of information have been gathered and/or for assignment to an investigator.

At 1312, a determination may be made as to whether the pre-work and/or assignment have been completed. If no, then the workflow 1300 may again continue to monitor the case. If yes, then another determination may be made at 1314 as to whether a SAR is required based on one or more predefined criteria. For example, a SAR may be required if the transaction is a brokerage or mutual fund transaction and the amount involved is greater than $5,000. If the transaction is not a brokerage or mutual fund transaction, but the amount involved is greater than $5,000 and the person conducting the transaction has previously been involved in a detected suspicious activity, or the amount involved is greater than $25,000 (regardless of who is conducting the transaction), then a SAR may still be required.

Upon determining that a SAR is required, the SAR workflow 1300 may establish the discovery date (i.e., the date when the suspicious activity was first discovered) and calculate the date that the SAR must be submitted at 1316. Based on current FinCEN requirements, the due date may be 30 days from the discovery date if a suspect has been identified, or it may be 60 days from the discovery date if no suspect has been identified. The due date may not be extended beyond 60 days from the discovery date under any circumstances according to current FinCEN requirements. Other criteria may also be factored into the due date calculation, such as whether a mutual fund or brokerage was involved, the amount was greater than $5,000, greater than $25,000, and so forth. For example, if a mutual fund or brokerage was involved, then the due date may not be extended beyond 30 days regardless of whether a suspect has been identified.

Once the discovery and due dates have been set, the SAR workflow 1300 may proceed to tracking and monitoring the status of the SAR record at 1318 and providing periodic reminders to the investigator of any impending due dates. In one implementation, the reminders may be in the form of pop-up windows, e-mail messages, voicemail messages and the like containing deadlines and any other information needed by an investigator (e.g., 13 days until deadline, five days until deadline, etc.). During this time, the investigator may continue to work on the case by gathering and entering additional information as needed (or available) as well as obtaining one or more reviews and/or approvals from supervisory personnel. The SAR workflow 1300 may also provide periodic reminders to the investigator's supervisor at 1320 of the deadlines and supervisory review requirements, if any. If a SAR submission deadline is missed, an alert may be sent to the investigator and his/her supervisor notifying them of the missed deadline. Management reports may be provided upon request to track the progress and status of the SAR queue for various investigators.

At 1322, a determination is made as to whether a SAR has been filed (e.g., by filling in the SAR Filed field of graphical user interface in FIG. 7A). If yes, then the process is completed and the SAR workflow 1300 closes out the case. Otherwise, the SAR workflow 1300 may repeat the discovery and due date calculations (in case new information entered by the investigator changes any of the due dates) and may continue the monitoring and notification functions described above. Such an arrangement provides a convenient, efficient, and uniform way to process SARs in a standardized manner while complying with FinCEN reporting requirements.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for managing data for a suspicious activity monitor (SAM), the system comprising:
   a processor;
   a memory communicatively coupled to the processor;
   at least one subsystem deployed in the memory and executable by the processor to receive transaction messages from a plurality of financial services, each transaction message containing data for a transaction provided by one of the plurality of financial services, the data being arranged in the transaction message according to a standard format, wherein the standard format includes a number of common domain values for each of a number of fields;
   at least one subsystem deployed in the memory and executable by the processor to detect and forward member and account data associated with each transaction message to a repository;
   at least one subsystem deployed in the memory and executable by the processor to determine whether enrichment of any transaction data of a particular transaction message is needed to conform to a preferred format of the SAM;
   at least one subsystem deployed in the memory and executable by the processor to enrich the transaction data of the particular transaction message in accordance with the preferred format of the SAM based on a particular portion of the member and account data of the repository associated with a member and account of the particular transaction message;
   at least one subsystem deployed in the memory and executable by the processor to filter one or more transaction messages according to one or more predefined criteria based on a message envelope of the transaction message;
   at least one subsystem deployed in the memory and executable by the processor to determine an update to a portion of the data associated with at least one member of a financial institution in filtered ones of the transaction messages;
   at least one subsystem deployed in the memory and executable by the processor to forward the determined update to the repository; and
   at least one subsystem deployed in the memory and executable by the processor to forward the data and the updated portion of the data in filtered ones of the transaction messages to the SAM.

2. The system of claim 1, wherein the one or more predefined criteria include: monetary transactions, and account maintenance transactions.

3. The system of claim 1, wherein the transaction messages are received in an asynchronous manner.

4. The system of claim 1, further comprising at least one subsystem configured to receive batch data files from at least one financial service, each batch data file containing transaction data for multiple transactions provided by the at least one financial service.

5. The system of claim 4, further comprising at least one subsystem configured to parse each batch data file into multiple lines of data, each line of data containing data representing one transaction.

6. The system of claim 5, further comprising at least one subsystem configured to create a transaction message from the data in each line of data, the data being arranged in the transaction message according to the standard format.

7. The system of claim 5, wherein the batch data files are received according to one of: daily, nightly, weekly, and monthly.

8. A method of managing data for a suspicious activity monitor (SAM), implemented by a computing device, the method comprising:
receiving, by the computing device, transaction messages from a plurality of financial services, each transaction message containing data for a transaction provided by one of the plurality of financial services, the data being arranged in the transaction message according to a standard format, wherein the standard format includes a number of common domain values for each of a number of fields;
detecting and forwarding member and account data associated with each transaction message to a repository;
determining whether enrichment of any transaction data of a particular transaction message is needed to conform to a preferred format of the SAM;
enriching the transaction data of the particular transaction message in accordance with the preferred format of the SAM based on a particular portion of the member and account data of the repository associated with a member and account of the particular transaction message;
filtering, by the computing device, one or more transaction messages according to one or more predefined criteria based on a message envelope of the transaction message;
determining an update to a portion of the data associated with at least one member of a financial institution in filtered ones of the transaction messages;
forwarding the determined update to the repository; and
forwarding, by the computing device, the data and the updated portion of the data in filtered ones of the transaction messages to the SAM.

9. The method of claim 8, wherein the one or more predefined criteria include: monetary transactions, and account maintenance transactions.

10. The method of claim 8, wherein the transaction messages are received in an asynchronous manner.

11. The method of claim 8, further comprising receiving batch data files from at least one financial service, each batch data file containing transaction data for multiple transactions provided by the at least one financial service.

12. The method of claim 11, further comprising parsing each batch data file into multiple lines of data, each line of data containing data representing one transaction.

13. The method of claim 12, further comprising creating a transaction message from the data in each line of data, the data being arranged in the transaction message according to the standard format.

14. The method of claim 12, wherein the batch data files are received according to one of: daily, nightly, weekly, and monthly.

15. A non-transitory computer-readable medium encoded with computer-readable instructions for managing data for a suspicious activity monitor (SAM), the computer-readable instructions comprising instructions for causing a computer to:
receive transaction messages from a plurality of financial services, each transaction message containing data for a transaction provided by one of the plurality of financial services, the data being arranged in the transaction message according to a standard format, wherein the standard format includes a number of common domain values for each of a number of fields;
detect and forward member and account data associated with each transaction message to a repository
determine whether enrichment of any transaction data of a particular transaction message is needed to conform to a preferred format of the SAM;
enrich the transaction data of the particular transaction message in accordance with the preferred format of the SAM based on a particular portion of the member and account data of the repository associated with a member and account of the particular transaction message;
filter one or more transaction messages according to one or more predefined criteria based on a message envelope of the transaction message;
determine an update to a portion of the data associated with at least one member of a financial institution in filtered ones of the transaction messages;
forward the determined update to the repository; and
forward the data and the updated portion of the data in filtered ones of the transaction messages to the SAM.

16. The computer-readable medium of claim 15, wherein the one or more predefined criteria include: monetary transactions, and account maintenance transactions.

17. The computer-readable medium of claim 15, wherein the transaction messages are received in an asynchronous manner.

18. The computer-readable medium of claim 15, further comprising instructions for causing a computer to receive batch data files from at least one financial service, each batch data file containing transaction data for multiple transactions provided by the at least one financial service.

19. The computer-readable medium of claim 18, further comprising instructions for causing a computer to parse each batch data file into multiple lines of data, each line of data containing data representing one transaction.

20. The computer-readable medium of claim 19, further comprising instructions for causing a computer to create a transaction message from the data in each line of data, the data being arranged in the transaction message according to the standard format.

21. The computer-readable medium of claim 19, wherein the batch data files are received according to one of: daily, nightly, weekly, and monthly.

* * * * *